United States Patent
Zhang et al.

(10) Patent No.: US 9,998,563 B2
(45) Date of Patent: Jun. 12, 2018

(54) VERTEX-CENTRIC SERVICE FUNCTION CHAINING IN MULTI-DOMAIN NETWORKS

(71) Applicant: Fujitsu Limited, Kawasaki-shi, Kanagawa (JP)

(72) Inventors: Qiong Zhang, Plano, TX (US); Paparao Palacharla, Richardson, TX (US); Xi Wang, Murphy, TX (US); Inwoong Kim, Allen, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 15/175,940

(22) Filed: Jun. 7, 2016

(65) Prior Publication Data
US 2017/0104847 A1 Apr. 13, 2017

Related U.S. Application Data

(60) Provisional application No. 62/240,199, filed on Oct. 12, 2015.

(51) Int. Cl.
*H04L 29/08* (2006.01)

(52) U.S. Cl.
CPC ........ *H04L 67/327* (2013.01); *H04L 67/1004* (2013.01)

(58) Field of Classification Search
CPC ........................ H04L 67/327; H04L 67/1004
See application file for complete search history.

(56) References Cited

U.S. PATENT DOCUMENTS

| | | | |
|---|---|---|---|
| 2005/0262232 A1* | 11/2005 | Cuervo | H04L 41/044 709/223 |
| 2015/0200838 A1* | 7/2015 | Nadeau | H04L 45/124 398/58 |
| 2016/0254998 A1* | 9/2016 | Jokela | H04L 45/308 370/390 |

OTHER PUBLICATIONS

"Network functions virtualization (NFV); User Cases," www.etsi.org/deliver/etsi_gs/nfv/001_009/001/01.01.01_60/gs_nfv001v010101p.pdf; 50 pages, 2013.

Mehragham, S., et al. "Specifying and Placing Chains of Virtual Network Functions," *Proc. IEEE CloudNet*, Luxembourg; 7 pages, 2014.

(Continued)

*Primary Examiner* — Kim T Nguyen
(74) *Attorney, Agent, or Firm* — Baker Botts L.L.P.

(57) ABSTRACT

Systems and methods for performing vertex-centric service function chaining in multi-domain networks are disclosed. A resource orchestration framework of a multi-domain network may include vertices representing physical nodes and edges representing physical links in the network. A sole resource orchestrator (in a centralized system) or multiple resource orchestrators (each associated with a respective domain in a distributed system) may coordinate execution of a common compute function on multiple vertices to identify candidate service function chain solutions to a service function chain request. The request may specify a fixed-ordered chain or a flexible-ordered chain. The compute function may, during each of multiple supersteps, determine whether a partially mapped chain can be extended on a given vertex, send a controller message to a neighbor vertex with which it has a qualified link, or return a completed chain, which may be selected for execution, dependent on applicable policies.

20 Claims, 19 Drawing Sheets

(56) References Cited

OTHER PUBLICATIONS

Malewicz, G., "Pregel: A System for Large-Scale Graph Processing," in Proc ACM SIGMOD, New York, NY; 11 pages, 2010.
Farrel, A., et al., "A Path Computation Element (PCE)-Based Architecture," Network Working Group, 40 pages, 2006.
Vasseur, JP., et al., "A Backward-Recursive PCE-Based Computation (BRPC) Procedure to Compute Shortest Constrained Inter-Domain Traffic Engineering Label Switched Paths," IETF RFC 5441, 19 pages, 2009.
Heller, B., et al., "The Controller Placement Problem," Proc. ACM HotSDN, New York, NY; 6 pages, 2012.
Hong, S., et al., "Effective VON Embedding Based on Topology Aggregation in Multi-Domain Optical Networks," OFC 2014, M3H.3; 3 pages, 2014.
Y. Low, et al., "Distributed GraphLab: a framework for machine learning and data mining in the cloud," in *Proc. VLDB*, vol. 5, No. 8, 2012; 12 pages.
W. Liu, et al., "Service function chaining general use cases," IETF internet draft, draft-liu-sfc-use-cases-Sep. 8, 2014; 20 pages.
Andreev, Konstantin, et al. "Balanced graph partitioning." Proceedings of the sixteenth annual ACM symposium on Parallelism in algorithms and architectures, 2004; 12 pages, Feb. 2014.
Vaishnavi, Ishan, et al. "Recursive, hierarchical embedding of virtual infrastructure in multi-domain substrates." Proceedings of the 1st IEEE Conference on Network Softwarization (NetSoft), London, UK, Apr, 2015; 9 pages.
Houidi, Ines, et al. "Virtual network provisioning across multiple substrate networks." Computer Networks, vol. 55, No. 4, Mar. 2011, pp. 1011-1023; 14 pages.
Xin, Yufeng, et al. "Embedding virtual topologies in networked clouds." Proceedings of the 6th ACM International Conference on Future Internet Technologies, New York, NY, 2011, pp. 26-29; 4 pages.
Chowdhury, Mosharaf, et al. "Polyvine: policy-based virtual network embedding across multiple domains." in Proceedings of the second ACM SIGCOMM workshop on Virtualized infrastructure systems and architectures, pp. 49-56, 2010; 8 pages.
Dietrich, David, et al. "Multi-domain virtual network embedding with limited information disclosure." Proceedings of IFIP Networking Conference, May 2013; 9 pages.
Zhang, Qiong, et al. "Resource Orchestration for Optically Interconnected Distributed Data Centers (Invited)." APC 2015; 20 pages.
Zhang, Qiong, et al. "Service function chaining in multi-domain networks." Optical Fiber Communications Conference and Exhibition (OFC), IEEE, 2016; 3 pages.
Zhang, Qiong, et al. "Vertex-centric computation of service function chains in multi-domain networks." NetSoft Conference and Workshops (NetSoft), IEEE, 2016; 8 pages.

\* cited by examiner

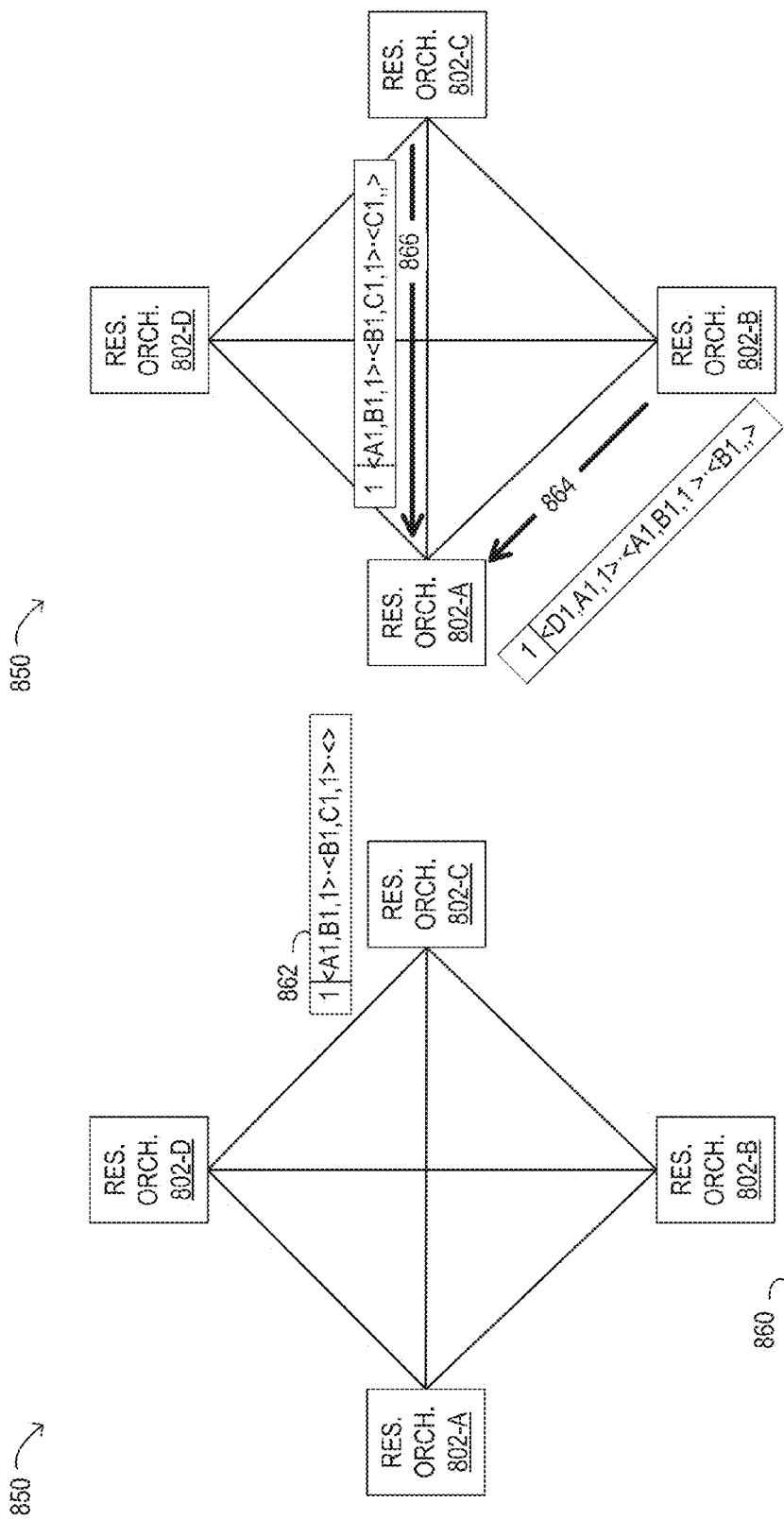

VERTEX-CENTRIC SERVICE FUNCTION CHAINING IN MULTI-DOMAIN NETWORKS

CROSS-REFERENCE TO RELATED APPLICATIONS

The present application claims the benefit of priority under 35 U.S.C. § 119 from U.S. Provisional Patent Application Ser. No. 62/240,199, filed on Oct. 12, 2015, and entitled "SERVICE FUNCTION CHAINING IN MULTI-DOMAIN NETWORKS", which is incorporated herein by reference in its entirety for all purposes.

BACKGROUND

Field of the Disclosure

The present disclosure relates generally to network function virtualization and, more particularly, to systems and methods for performing vertex-centric service function chaining in multi-domain networks.

Description of the Related Art

Emerging network applications, such as cloud and big data, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-domain networks. For example, a network service may traverse one or more consumer broadband networks, mobile backhaul networks, mobile packet core networks, and/or virtual private networks.

Traditional distributed routing protocols typically compute network paths without considering the availability of service functions and virtual machines at the individual network nodes. A hybrid architecture (e.g., one with geographically distributed orchestrators that replicate a global view of service functions, virtual machines, and networks) can lead to additional challenges, such as managing the global network state, maintaining the confidentiality of various network domains, and managing high computation complexity on a large-scale global view. An approach using path-computation element (PCE)-based multi-domain heuristics to for map virtual optical network requests would typically require a parent PCE to compute all possible inter-domain paths. Furthermore, mapping a single virtual link would typically require signaling along all possible inter-domain paths, which can result in significant signaling overhead for a very large number of paths in a large-scale network. Previously proposed virtual network mapping algorithms for multi-domain networks can be suitable for mapping service function chain (SFC) requests, but they typically require a centralized orchestrator to maintain a hierarchical topology for all domains in a multi-domain network.

SUMMARY

In one aspect, a disclosed method is for identifying a qualified service function chaining solution in a multi-domain network. The method may include receiving, at a resource orchestrator, a service function chain request specifying a plurality of service functions to be performed on respective physical nodes in the multi-domain network, each node being represented as a vertex in a resource orchestration framework, and identifying one or more vertices at which a first one of the plurality of service functions is available. The method may also include, for a first one of the identified vertices, mapping the first identified vertex to the first one of the plurality of service functions in a candidate service function chain, determining that a second one of the plurality of service functions is available at a first neighbor vertex of the first identified vertex, where the first neighbor vertex resides in a different domain of the multi-domain network than the domain in which the first identified vertex resides, and mapping the first neighbor vertex to the second one of the plurality of service functions in the candidate service function chain to extend the candidate service function chain.

In any of the disclosed embodiments, the method may further include determining that a third one of the plurality of service functions is available at a second neighbor vertex of the first neighbor vertex, where the second neighbor vertex resides in a different domain of the multi-domain network than the domain in which the first neighbor vertex resides, and mapping the second neighbor vertex to the third one of the plurality of service functions in the candidate service function chain to further extend the candidate service function chain.

In any of the disclosed embodiments, mapping the first neighbor vertex to the second one of the plurality of service functions in the candidate service function chain may complete the candidate service function chain, and the method may further include returning the completed candidate service function chain to the resource orchestrator.

In any of the disclosed embodiments, the service function chain request may specify a fixed order for the plurality of service functions to be performed on the respective physical nodes in the multi-domain network, and the fixed order may specify that the first one of the plurality of service functions is to be performed prior to the second one of the plurality of service functions.

In any of the disclosed embodiments, the method may further include completing the candidate service function chain, and completing one or more other candidate service function chains. Completing each of the other candidate service function chains may include mapping a respective vertex in the resource orchestration framework to each of the plurality of service functions in the other candidate service function chain. The sets of mappings in the candidate service function chain and in each of the one or more other candidate service function chains may be different. The method may also include selecting, from among the candidate service function chain and the one or more other candidate service function chains, one or more service function chain solutions for execution. The selecting may be dependent on a service provider policy, a service provider constraint, or a requestor on whose behalf the service function chain request was received.

In any of the disclosed embodiments, the selecting may be dependent on one or more of: a total delay of a candidate service function chain, a total cost of a candidate service function chain, an overlapping of physical nodes in two of the candidate service function chains, an overlapping of physical links in two of the candidate service function chains, or a load balancing mechanism.

In any of the disclosed embodiments, the service function chain request may specify a flexible-ordering for the plurality of service functions to be performed on the respective physical nodes in the multi-domain network, and mapping the first identified vertex to the first one of the plurality of service functions in the candidate service function chain may include mapping the first identified vertex to a service function in a position other than the first position in the candidate service function chain.

In any of the disclosed embodiments, the method may further include completing the candidate service function chain, and completing a second candidate service function chain. Completing the second candidate service function chain may include mapping a respective vertex in the resource orchestration framework to each of the plurality of service functions in the second candidate service function chain. Vertices may be mapped to the plurality of service functions in the second candidate service function chain in a different order than the order in which they were mapped to the plurality of service functions in the candidate service function chain.

In any of the disclosed embodiments, the resource orchestrator may be a sole resource orchestrator for coordinating vertex-centric service function chaining in the multi-domain network.

In any of the disclosed embodiments, the resource orchestrator may be one of a plurality of resource orchestrators for coordinating vertex-centric service function chaining in the multi-domain network, each of which is associated with a respective domain in the multi-domain network, and each of which coordinates execution of a common compute function on vertices in its respective domain.

In any of the disclosed embodiments, identifying the one or more vertices at which a first one of the plurality of service functions is available may include the resource orchestrator sending a controller message to another one of the resource orchestrators, the other resource orchestrator being associated with the domain in which the first identified vertex resides, and the other resource orchestrator determining that the first one of the plurality of service functions is available at the first identified vertex. Mapping the first identified vertex to the first one of the plurality of service functions in the candidate service function chain may be performed by the first identified vertex.

In any of the disclosed embodiments, the first one of the identified vertices and the first neighbor vertex may be communicatively coupled to each other over a physical link, and determining that the second one of the plurality of service functions is available at the first neighbor vertex may include determining that the physical link meets qualifications specified for the service function chain request, sending a controller message including the candidate service function chain to the first neighbor vertex, and the first neighbor vertex determining that the second one of the plurality of service functions is available at the first neighbor vertex.

In another aspect, a disclosed resource orchestration framework in a multi-domain network may include a plurality of vertices, each of which represents a respective one of the physical nodes in the multi-domain network, and a resource orchestrator. The multi-domain network may include a plurality of network domains, each including one or more physical nodes. Each of the physical nodes may include circuitry or logic to perform a subset of a plurality of service functions supported in the multi-domain network. Each of the vertices in the resource orchestration framework may include a processor, and a memory that stores program instructions that when executed by the processor cause the processor to perform a compute function that is common among the vertices in the resource orchestration framework. The resource orchestrator may include a processor, and a memory that stores program instructions that when executed by the processor cause the processor to perform receiving a service function chain request specifying a plurality of service functions to be performed on respective ones of the physical nodes in the multi-domain network, identifying one or more vertices in the resource orchestration framework at which a first one of the plurality of service functions is available, and coordinating execution of two more supersteps of the common compute function on multiple ones of the plurality of vertices. During a first superstep of the common compute function, the execution of the common compute function on the first one of the identified vertices may include mapping the first identified vertex to the first one of the plurality of service functions in a candidate service function chain, and determining whether or not a physical link between the first identified vertex and a first neighbor vertex of the first identified vertex meets qualifications specified for the service function chain request. The first neighbor vertex may reside in a different domain of the multi-domain network than the domain in which the first identified vertex resides.

In any of the disclosed embodiments, during the first superstep, the execution of the common compute function on the first identified vertex may further include, in response to determining that a physical link between the first identified vertex and the first neighbor vertex meets qualifications specified for the service function chain request, providing the candidate service function chain to the first neighbor vertex. During a second superstep of the common compute function, the execution of the common compute function on the first neighbor vertex may include, in response to obtaining the candidate service function chain, determining whether or not the candidate service function chain can be extended at the first neighbor vertex.

In any of the disclosed embodiments, during the second superstep, the execution of the common compute function on the first neighbor vertex may further include determining that a second one of the plurality of service functions is available at the first neighbor vertex, and mapping the first neighbor vertex to the second one of the plurality of service functions in the candidate service function chain to extend the candidate service function chain.

In any of the disclosed embodiments, during the second superstep, the execution of the common compute function on the first neighbor vertex may further include determining whether or not a physical link between the first neighbor vertex and a second neighbor vertex of the first neighbor vertex meets qualifications specified for the service function chain request. The second neighbor vertex may reside in a different domain of the multi-domain network than the domain in which the first neighbor vertex resides. During the second superstep, the execution of the common compute function on the first neighbor vertex may also include, in response to determining that the physical link between the first neighbor vertex and the second neighbor vertex meets qualifications specified for the service function chain request, providing the extended candidate service function chain to the second neighbor vertex.

In any of the disclosed embodiments, during the second superstep, the execution of the common compute function on the first neighbor vertex may further include determining that the mapping of the first neighbor vertex to the second one of the plurality of service functions in the candidate service function chain completes the candidate service function chain, and providing the completed candidate service function chain to the resource orchestrator.

In any of the disclosed embodiments, when executed by the processor of the resource orchestrator, the program instructions stored on the memory of the resource orchestrator cause the processor to perform selecting, from among the completed candidate service function chain and one or more other completed candidate service function chains, one or more service function chain solutions for execution. The selection may be dependent on a service provider policy, a service provider constraint, or a requestor on whose behalf the service function chain request was received.

In any of the disclosed embodiments, the resource orchestrator may be a sole resource orchestrator for coordinating vertex-centric service function chaining in the multi-domain network.

In any of the disclosed embodiments, the resource orchestration framework may include a plurality of resource orchestrators, including the resource orchestrator, each of which is associated with a respective domain in the multi-domain network, and each of which coordinates the execution of the two more supersteps of the common compute function on vertices in its respective domain.

BRIEF DESCRIPTION OF THE DRAWINGS

For a more complete understanding of the present invention and its features and advantages, reference is now made to the following description, taken in conjunction with the accompanying drawings, in which:

FIGS. 8A-8J illustrate an example of vertex-centric distributed computing for generating one or more candidate solutions to a service function chain request, according to one embodiment;

DESCRIPTION OF THE EMBODIMENT(S)

Figure 1:
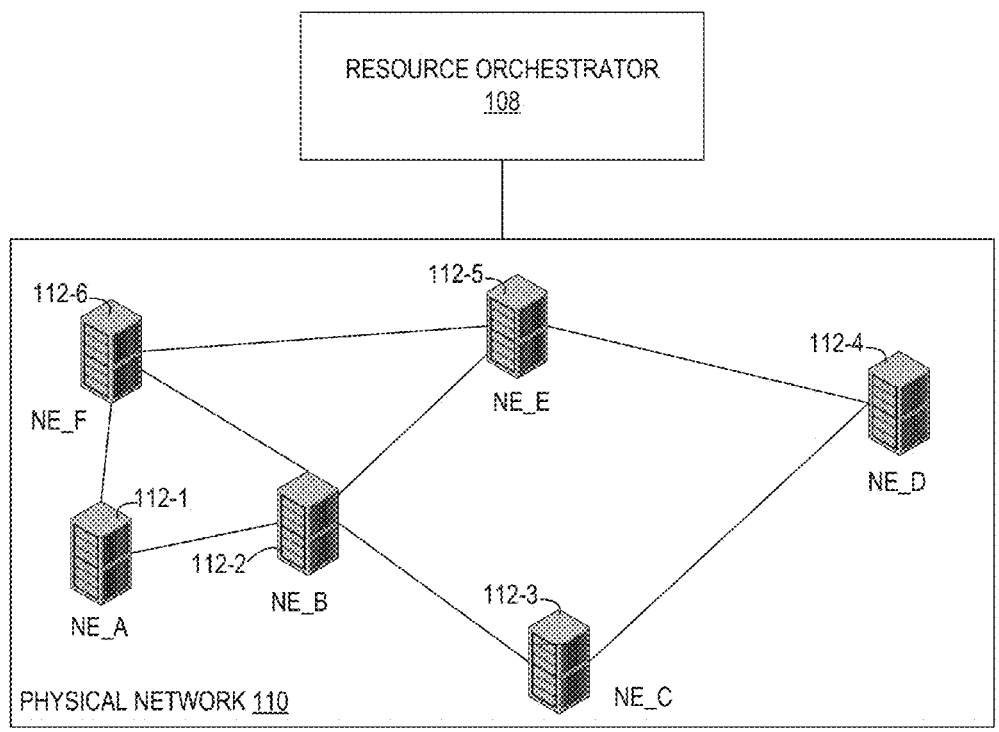
FIG. 1 illustrates selected elements of a distributed resource orchestration framework, according to at least some embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As will be described herein, a distributed resource orchestration framework is disclosed that provides a scalable vertex-centric distributed approach for identifying all qualified service function chain (SFC) solutions in a multi-domain network. In some embodiments, the distributed resource orchestration framework disclosed herein may apply vertex-centric distributed processing approach that enables different vertices to exchange information about possible SFC solutions iteratively using controller messages until all possible solutions have been identified. In some embodiments of the distributed resource orchestration framework disclosed herein, each domain resource orchestrator managing the resources of a network domain may send messages to each vertex in its network domain, and the domain resource orchestrators may communicate with each other using controller messages. Simulation results have demonstrated superior efficiency and scalability for computing a large SFC request when compared to a centralized algorithm.

Turning now to the drawings, FIG. 1 illustrates selected elements of a distributed resource orchestration framework, according to at least some embodiments. More specifically, FIG. 1 illustrates an example embodiment of a network domain 100, which is based on vertices that are individual network elements (NE). In FIG. 1, network domain 100 is shown including domain-specific resource orchestrator 108, and physical network 110. In some embodiments, physical network 110 may be an underlying optical network, such as an optical transport network (OTN) or a flexible optical data plane (e.g., flexible transceivers) configured to adjust the bandwidth of connections.

In FIG. 1, resource orchestrator 108 may manage or coordinate the use of resources within network domain 100, shown comprising multiple network elements 112. Network elements 112 may represent various types of network functionality, such as switches, routers, etc., and may include hardware to interconnect various types of physical interfaces. Network domain 100 comprises network element NE_A 112-1, network element NE_B 112-2, network element NE_C 112-3, network element NE_D 112-4, network element NE_E 112-5, and network element NE_F 112-6, along with connections between the network elements that may have different distances. Thus, network domain 100 may represent a network topology for a single network domain, the use of whose resources are coordinated by resource orchestrator 108. Note that, in some embodiments, various network management functions for network domain 100 other than those provided by resource orchestrator 108 may be provided by a dedicated (e.g., domain-specific) SDN controller (not shown). When larger networks include multiple network domains, each individual network domain may be managed by a respective SDN controller.

As disclosed in further detail herein, network domain 100 may be included in a multi-domain network that uses a distributed processing approach and in which controller messages are exchanged between a plurality of resource orchestrators and/or network controllers, such as resource orchestrator 108 and/or an SDN controller, each of which is associated with a respective one of a plurality of network domains, such as physical network 110. As described herein, the resource orchestrators may work collaboratively to execute an SFC in the multi-domain network, which may include identifying all possible SFC solutions, selecting one or more of the possible SFC solutions for execution (e.g., dependent on user preferences or various policies), and configuring the physical resources of various network nodes to implement the selection solution(s).

As previously noted, network function virtualization (NFV) may be used to virtualize network functions and migrate them from devices that are built for a single, specific purpose to multi-purpose virtual machines on commercial off-the-shelf servers, which may reduce service deployment costs and improve service flexibility. In systems that implement NFV, in order to provide an end-to-end network service, virtual network functions (VNFs) may need to be invoked in a sequential order, referred to as a service function chain (SFC). Service function chaining may involve configuring and/or allocating various virtual machines (VMs) to run these virtualized network functions, and may also involve steering traffic across one or more networks. For example, a traffic flow may be steered through a number of virtual network functions (VNFs) or service functions (SFs) in a specific order based on the service provider's policies and/or on user preferences. In some embodiments of the distributed resource orchestration frameworks described herein, service function chaining may be supported by the application of resource orchestration. For example, in some embodiments, a plurality of resource orchestration elements, referred to herein as resource orchestrators, may collectively and individually manage and coordinate the use of various resources (including service functions, virtual machines, and networks) at each data center, as well as the associated network resources to interconnect the VNFs. With the migration of VNFs to VMs in geographically distributed datacenters and the rollout of SDN controlled on-demand connectivity in IP/OTN networks, distributed resource orchestration across multi-domain networks, as described herein, may be highly beneficial for providing end-to-end network services. For example, a network service may span across multiple networks such as consumer broadband, mobile backhaul, mobile packet core, and/or virtual private networks (including, e.g., networks implemented on the 1Finity™ platform from Fujitsu Network Communications Inc.).

In various embodiments of the present disclosure, a large-scale multi-domain network may include many different domains, and these domains may have different network technologies, different vendors, different administration, different types of resources, and/or different virtualized networks. These domains may include domains in which reside Internet of Things (IoT) devices, computing resources, storage resources, and/or different types of service functions (including access service functions, metro service functions, and/or core service functions). In at least some embodiments, these multi-domain networks may preserve confidentiality among domains and improve scalability for service providers. In at least some of the multi-domain orchestration architectures described herein, each domain may be controlled by a local orchestrator, and vertex-centric distributed computing among the orchestrators may provide for end-to-end resource allocation.

Figure 2:
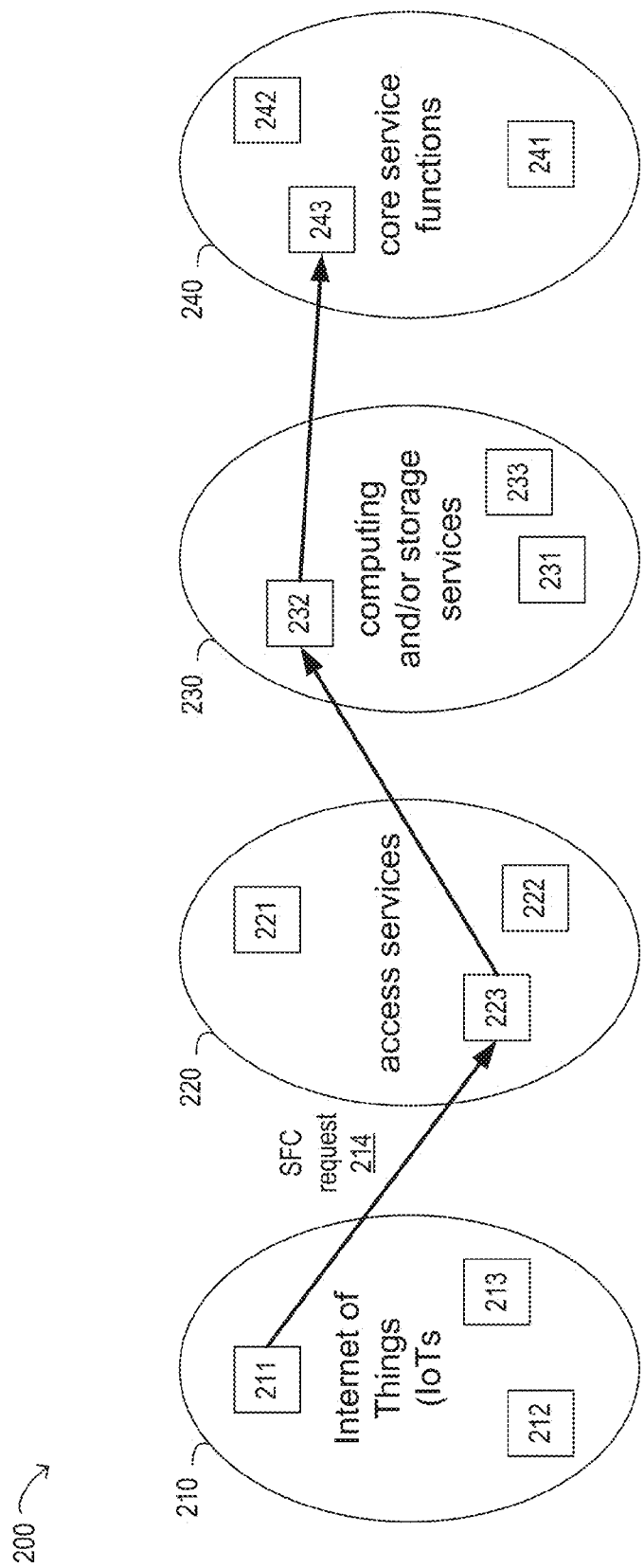
FIG. 2 is a block diagram illustrating selected elements of a multi-domain network for providing end-to-end services, according to one embodiment.

FIG. 2 is a block diagram illustrating selected elements of a multi-domain network for providing end-to-end services, according to one embodiment. In this example embodiment, multi-domain network 200 includes four domains, shown as domains 210, 220, 230, and 240. Each of these domains may include one or more nodes (vertices), at least some of which may implement one or more service functions using the resources within that domain. The first domain, domain 210, represents the Internet of Things (IoTs), various devices of which may issue service function chain requests. Three such devices are illustrated in FIG. 2 as devices 211, 212, and 213, although any number of devices may be included in domain 210, in different embodiments. In this example embodiment, the second domain, domain 220, represents one or more data centers or other entities that provide access services that may be included in a service function chain. Three such services are illustrated in FIG. 2 as services 221, 222, and 223, although any number of devices may be included in domain 220, in different embodiments.

In this example embodiment, the third domain, domain 230, represents one or more data centers or other entities that provide computing and/or storage services that may be included in a service function chain. Three such services are illustrated in FIG. 2 as services 231, 232, and 233, although any number of devices may be included in domain 230, in different embodiments. In this example embodiment, the fourth domain, domain 240, represents one or more data centers or other entities that provide core service functions that may be included in a service function chain. Three such services are illustrated in FIG. 2 as core service functions 241, 242, and 243, although any number of devices may be included in domain 240, in different embodiments.

In the example illustrated in FIG. 2, device 211 within domain 210 has issued a service function chain request 214, which includes at least one access service, one computing or storage service, and one core service function. More specifically, service function chain request 214 specifies a service function chain that includes an access service function 223 (which is available on one of the nodes/vertices within domain 220), a computing or storage service function 232 (which is available on one of the nodes/vertices within domain 230), and a core service function 243 (which is available on one of the nodes/vertices within domain 240).

As described in detail herein, in various embodiments, the systems and method described herein for performing vertex-centric distributed computing to identify all qualified service function chain (SFC) solutions for an SFC request may be applied in systems that include network function virtualization, mobile edge computing, and/or IoTs with data analytics, and in which traffic traverses a sequence of service function instances across multiple domains.

In at least some embodiments of the present disclosure, each domain in a multi-domain network may include physical nodes and IP/OTN links. In at least some embodiments, a respective resource orchestrator may be associated with each network domain to manage all the physical nodes and links within its domain. In some embodiments, each physical node may include network elements (e.g., OTN switch, router) and/or compute servers and storage elements (e.g., datacenters) capable of invoking a subset of service functions selected from a catalog of service functions. Some examples of the service functions provided in these multi-domain networks include firewalls, deep packet inspection (DPI), network address translation (NAT), load balancers, and parental control functions. In one example, a service function chain may include a firewall, a deep packet inspection (DPI) service function, a parental control service function, and an anti-virus service function, each of which may be provided by nodes in a different network domain. In another example, a service function chain may include a network address translation (NAT) service function between two other types of service functions and/or between other service functions and an internet access service function, each of which is provided by nodes in a different network domain.

Figure 3:
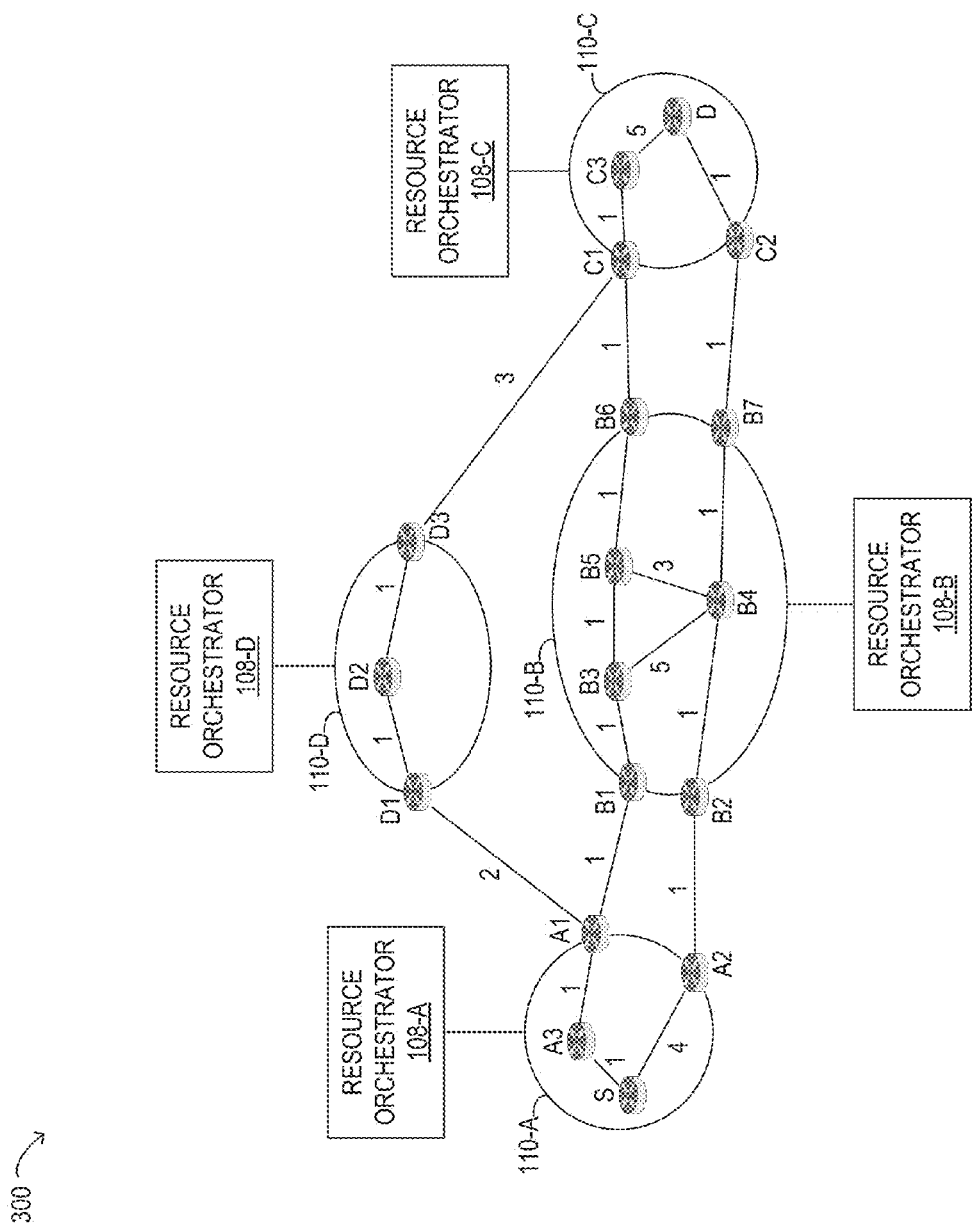
FIG. 3 is a network diagram illustrating selected elements of multiple distributed network domains, according to one embodiment.

Referring now to FIG. 3, selected elements of multiple distributed network domains are shown as a network diagram. In this example embodiment, the distributed network domains represent an exemplary embodiment of a multi-domain network 300 in which the use of resources for satisfying an SFC request is coordinated by a respective plurality of resource orchestrators 108, such as those illustrated in FIG. 1 and described herein. Although the distributed network domains within multi-domain network 300 are shown as a specific network topology, it will be understood that various different types and sizes of networks and different numbers of network domains may be used with the network service computation system disclosed herein. Note that the distributed network domains within multi-domain network 300 are shown as a schematic illustration and are not drawn to scale.

In FIG. 3, multi-domain network 300 includes a plurality of domains 110, each comprised of individual vertices. A vertex may represent any of a variety of network nodes, such as a switch, a router, a network element, a data center, a sub-network, a sub-domain, among others. Thus, each vertex may be enabled to provide network connectivity to other vertices, as well as computational resources, such as for providing network services and supporting network applications. As shown, a connection link is provided between vertices and is labeled in FIG. 3 with an integer value representing a relative path distance for the connection link. This relative path distance may represent a delay between the vertices or other edge information (e.g., bandwidth), in other embodiments. It is noted that the connection links may be intra-domain and inter-domain.

The vertices in multi-domain network 300 represent a reachable network of vertices that may provide potential paths between a source vertex S and a destination vertex D. In this example, each domain has a local orchestrator 108. For example, resource orchestrator 108-A may coordinate the use of resources within domain 110-A, which includes source vertex S, and vertices A1, A2, and A3; resource orchestrator 108-B may coordinate the use of resources within domain 110-B, which includes vertices B1, B2, B3, B4, B5, B6, and B7; resource orchestrator 108-C may coordinate the use of resources within domain 110-C, which includes vertices C1, C2, C3, and destination vertex D; and resource orchestrator 108-D may coordinate the use of resources within domain 110-D, which includes vertices D1, D2, and D3. In some embodiments of the distributed network domains shown within multi-domain network 300, each resource orchestrator 108 (and/or an SDN controller for the domain) may communicate with vertices in its own respective domain 110, while the vertices may refrain from communicating with each other.

In some embodiments, when computing service function chaining requests, each vertex (node) may send and receive messages inside a compute function to and from its vertex neighbors. For example, vertex (node) A1 has three edges, as it has three vertex neighbors that it can communicate with, and a common compute function. Vertex A1 may also have node information indicating, for example, the number of compute resources available on the node, the number of storage resources available on the node, the vertex ID for the node, and the service functions that are implemented and available on the node. In at least some embodiments, the resource orchestrators associated with different domains may be interconnected via control channels for communication to compute requests (e.g., service function chaining requests), based on the vertex-centric distributed processing described herein.

In at least some embodiments, the resource orchestrators (such as various ones of the resource orchestrators 108 illustrated in FIGS. 1 and 3) may communicate with each other and may be networked together using any suitable topology, such as a mesh, a ring, a star, or a bus, among others. Similarly, SDN controllers for the domains may communicate with each other and may be networked together using any suitable topology, such as a mesh, a ring, a star, or a bus, among others. In some embodiments, the communication among resource orchestrators 108 and/or among SDN controllers may employ a sideband network channel, or other network connection for management purposes, that does not otherwise interfere with the network connections between vertices, which may represent a payload network offered as a commercial service to customers by a service provider.

In at least some embodiments, the resource orchestrators (such as various ones of the resource orchestrators 108 illustrated in FIGS. 1 and 3) may send messages to each other to compute a final result for a distributed computation to solve a service function chain request. In such embodiments, each resource orchestrator may maintain a logical representation of the physical infrastructure of its own domain, where the vertices in the resource orchestration architecture represent the physical nodes in that domain. In at least some embodiments, in addition to maintaining vertex information (such as the node information described above), each vertex may also maintain information about its incoming and outgoing edges, and a common compute function, which is user-defined function. In at least some embodiments, for distributed computing among orchestrators, a computation may be broken down into iterations, called supersteps. In each superstep, each orchestrator may coordinate the execution of the compute functions of each vertex within its domain.

Figure 4:
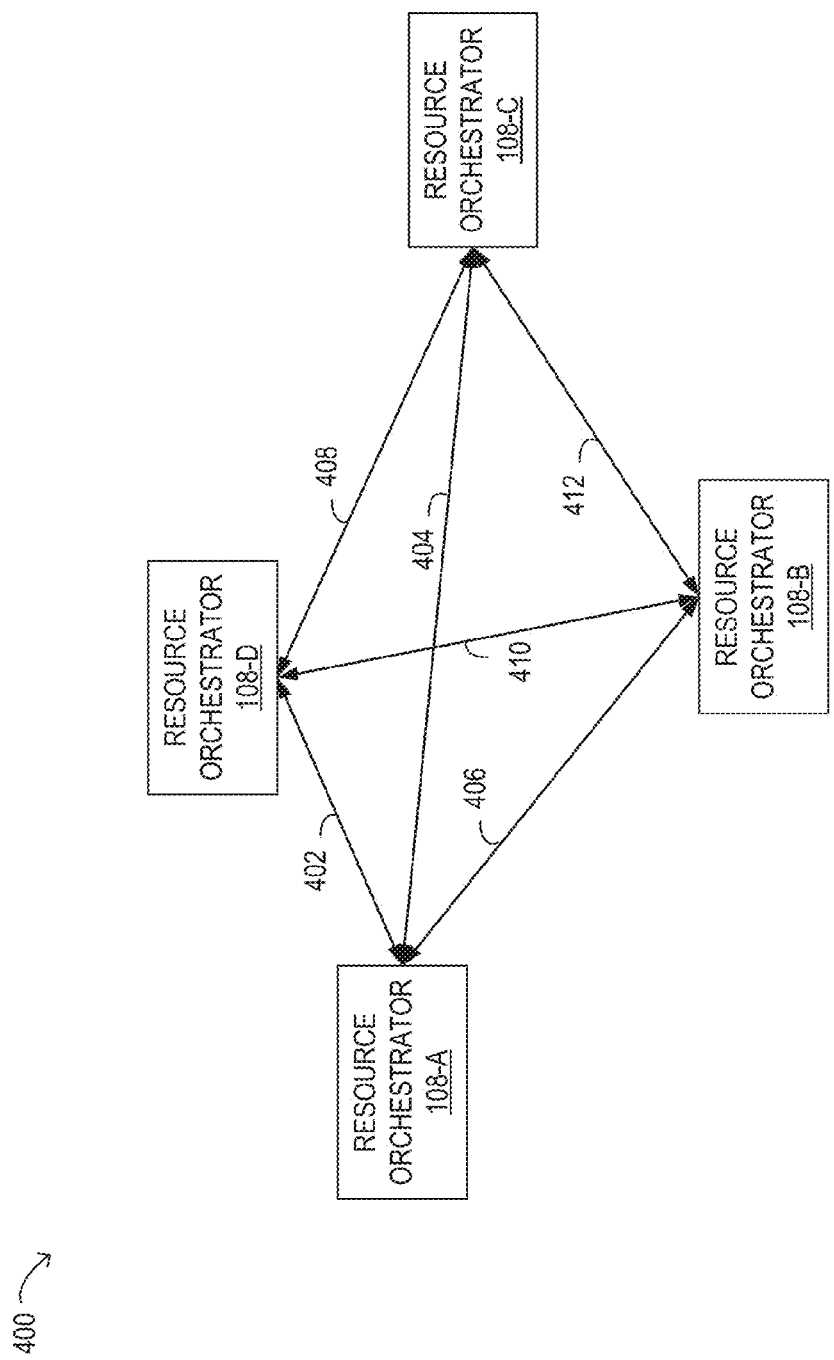
FIG. 4 illustrates a distributed resource orchestration architecture, including communication channels (or links) between respective resource orchestrators of different domains, according to one embodiment.

FIG. 4 illustrates a distributed resource orchestration architecture 400, including the communication channels (or links) between the respective resource orchestrators of the different domains illustrated in FIG. 3. In this example, the link between resource orchestrator 108-A (which coordinates the use of resources within domain 110-A) and resource orchestrator 108-B (which coordinates the use of resources within domain 110-B) is shown as link 406. Similarly, the link between resource orchestrator 108-A and resource orchestrator 108-C (which coordinates the use of resources within domain 110-C) is shown as link 404; the link between resource orchestrator 108-A and resource orchestrator 108-D (which coordinates the use of resources within domain 110-D) is shown as link 402; the link between resource orchestrator 108-B and resource orchestrator 108-D is shown as link 410; the link between resource orchestrator 108-C and resource orchestrator 108-D is shown as link 408; and the link between resource orchestrator 108-B and resource orchestrator 108-C is shown as link 412.

In the example illustrated in FIG. 3 and FIG. 4, there are four network domains, and each network domain may include multiple physical nodes and optical transport network (OTN) overlay links. Each physical node may be a switch, router, or data center that includes one or more virtual machines and that is capable of invoking a set of service functions. For example each physical node may be capable of providing a firewall, deep packet inspection (DPI), a WAN optimization controller (WOC), customer premises equipment (CPE), a provider edge (PE) or, in general, any type of service function.

In various embodiments of the present disclosure, a distributed resource orchestration framework and a vertex-centric distributed algorithm may be employed for finding all qualified SFCs in multi-domain networks. In some embodiments, after identifying all qualified chains, one or more SFCs may be selected for execution based on any suitable criteria. For example, an SFC may be selected for execution that best reflects user preferences for resource usage or other policy decisions. In another example, the lowest-cost disjoint SFC may be selected (e.g., to address protection concerns). In yet another example, multiple parallel SFCs may be selected for execution, according to a user preference or an applicable SFC selection policy.

In at least some embodiments, an SFC request may include information specifying the following request elements: the service functions to be performed, the resources required to perform those service functions (e.g., the required number of virtual machines and/or storage resources), and delay or bandwidth requirements for the links between the nodes on which the different service functions in the chain are to be performed.

Figure 5:
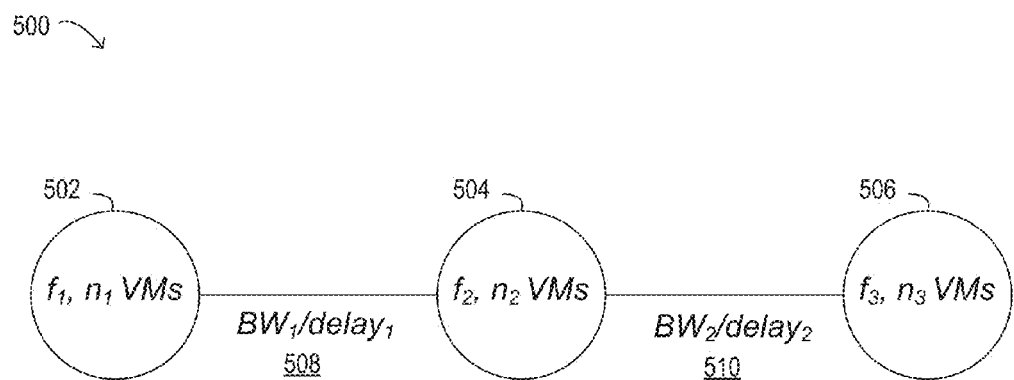
FIG. 5 depicts an abstraction of an example SFC request, according to one embodiment.

FIG. 5 depicts an abstraction of an example SFC request 500, according to one embodiment. In this example, to satisfy SFC request 500, the distributed resource orchestration mechanism may need to identify a first node 502 that includes $n_1$ virtual machines (VMs) and can perform a first service function, $f_1$; a second node 504 that includes $n_2$ virtual machines (VMs) and can perform a second service function, $f_2$; and a third node 506 that includes $n_3$ virtual machines (VMs) and can perform a third service function, $f_3$. In addition, the distributed resource orchestration mechanism may need to verify that the link between node 502 and node 504 meets a first set of bandwidth and/or delay requirements 508 (e.g., $BW_1$ and/or $delay_1$), and that the link between node 504 and node 506 meets a second set of bandwidth and/or delay requirements 510 (e.g., $BW_2$ and/or $delay_2$).

In contrast to other types of virtual network requests, SFC requests may include two unique characteristics: they may be more linear in topology, and they may be flexible in terms of the order in which the service functions are executed, in some cases. Based on these characteristics of SFC requests, the distributed algorithm described herein may apply a vertex-centric distributed computing approach to solve service function chaining in multi-domain networks. In some embodiments, multiple service functions in an SFC can be mapped to a single physical node.

Figures 6A, 6B:
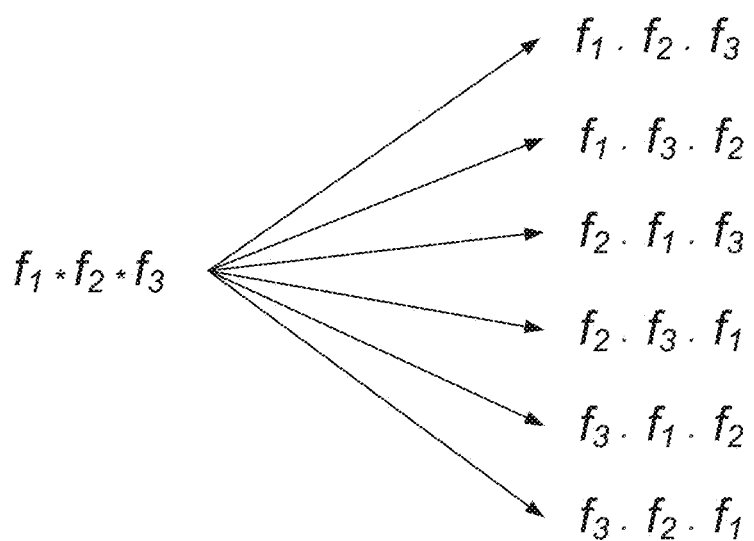
FIGS. 6A and 6B illustrate an example mapping between an SFC request specifying a flexible-ordered service function chain and six possible fixed-ordered chains, any of which, if found, would satisfy this request, according to one embodiment.

FIGS. 6A and 6B illustrate an example mapping between an SFC request specifying a flexible-ordered service function chain, $f_1 * f_2 * f_3$ (shown in FIG. 6A) and six possible fixed-ordered chains, any of which, if found, would satisfy this request. These six fixed-ordered chains are shown in FIG. 6B as $f_1 \cdot f_2 \cdot f_3$, $f_1 \cdot f_3 \cdot f_2$, $f_2 \cdot f_1 \cdot f_3$, $f_2 \cdot f_3 \cdot f_1$, $f_3 \cdot f_1 \cdot f_2$, and $f_3 \cdot f_2 \cdot f_1$. In these figures, the symbol "*" between functions denotes a flexible ordering and the symbol "·" between functions denotes a fixed order.

As previously noted, in various embodiments, a vertex-centric distributed processing approach may include performing iterations of supersteps that are sequentially executed. Each superstep may involve receiving controller messages or information at one or more resource orchestrators (such as various ones of the resource orchestrators 108 illustrated in FIG. 1, 3, or 4) or SDN controllers, performing local actions (in this case, executing a common compute function) at respective network domains 110, and then sending out controller messages to other resource orchestrators 108 or SDN controllers. It is noted that a vertex-centric distributed processing approach may be employed with a suitable network operating system using distributed network domains such as those illustrated in FIGS. 2, 3, and 4. In some embodiments, a resource orchestrator 108 or an SDN controller for each network domain 110 may keep track of the network topology of its respective network domain 110.

In some embodiments, the controller messages may be inter-domain messages sent with respect to a sending vertex and a target vertex that are in different domains. In some embodiments, each controller message may include: a sending vertex identifier; a target vertex identifier, and a minimum distance from source vertex S to the target vertex. It is noted that in various embodiments, different numbers of supersteps may result in the identification of all possible SFC solutions.

As previously noted, in some embodiments, each network domain may include (or be associated with) a respective resource orchestrator that manages (and coordinates the use of) the physical nodes and links within its domain. These distributed resource orchestrators may be interconnected by control channels (e.g., in-band control channels or out-of-band control channels, in different embodiments). In at least some embodiments, each orchestrator may store information about each physical node as a vertex data structure and may store information about each overlay OTN link as an edge data structure. In at least some embodiments, each vertex data structure may include a current value, a set of incoming/outgoing edges, and a common compute( ) function (an example embodiment of which is illustrated by pseudo-code shown later), which may be a user-defined function. In at least some embodiments, each edge data structure may include information about a respective OTN link, such as its bandwidth, delay information, information about the cost to use the link, and/or any other information usable in the system. In some embodiments, each vertex may be able to send and/or receive messages to and/or from other vertices. Messages may be delivered in memory (e.g., if they are exchanged between vertices that are within the same network domain or are controlled by the same orchestrator), while messages exchanged between vertices that are in different network domains or are controlled by different orchestrators may be delivered via various control channels.

Distributed Service Function Chaining Algorithm

In at least some embodiments of the distributed resource orchestration framework described herein, there may be no global network topology and no global node information available. Instead, each orchestrator may only have access to a partition of a global network topology. In such embodiments, in order to identify one or more candidate solutions for an SFC request, a vertex-centric distributed process may be adopted, in which each computation is broken down into iterations, called supersteps. In such embodiments, in each superstep, the compute( ) function of each vertex may be executed once. For example, in some embodiments, upon the arrival of an SFC request, a source orchestrator may send the SFC request to all participating orchestrators and may coordinate all orchestrators to execute the compute( ) function in each superstep. During each superstep, these compute functions may be executed substantially in parallel on vertices (nodes) in different domains, but they may synchronize with each other at the end of each superstep. For example, before moving on to the next superstep, the resource orchestrators may ensure that message exchanges for the current superstep have ceased and that all of the vertices received the controller messages that they were supposed to receive from the other vertices over the control channels.

Once a qualified solution to an SFC request is found at a vertex, it may be emitted to the source orchestrator. The distributed computing may halt when there are no further messages exchanged between orchestrators. In some embodiments, after obtaining all qualified SFC solutions from the participating orchestrators, the source orchestrator may select an optimal multi-domain SFC solution for execution based on various user preferences and/or applicable resource usage policies, and may inform the associated orchestrators (e.g., those that manage the resources selected to execute the requested SFC) that they should configure the physical nodes within their own domains accordingly (e.g., as needed to perform the various functions of the SFC). As previously noted, in some embodiments (e.g., dependent on various user preferences and/or applicable resource usage policies), the source orchestrator may select two or more of the possible SFC solutions for execution in parallel. In such embodiments, the source orchestrator may inform all of the orchestrators associated with the selected SFC solutions that they should configure the physical nodes within their own domains to perform particular ones of the functions of the SFC.

In some embodiments, providing distributed service function chaining, given a multi-domain network topology (a physical infrastructure topology) that includes vertices (nodes) and edges (links between the nodes), given a set of service functions and the number of compute and/or storage resources available at each vertex, and given the delay and bandwidth at each edge, may include identifying all possible solutions for an SFC request. As previously noted, each SFC request may specify a sequence of service functions. Each service function may use a certain number of compute and/or storage resources (e.g., virtual machines) and may require a certain amount of bandwidth (or have an upper limit on delay) for outgoing traffic. In some embodiments, after identifying all feasible mapping solutions for an SFC request, the solutions may be pruned according to various policies, requirements, or constraints imposed by a service provider or the requestor of the services. For example, they may be pruned to include only those solutions that have the lowest total cost or the lowest total delay, a subset of solutions that include multiple disjoint chains, those solutions that do (or do not) include bi-directional chains, or that meet multiple different constraints. In some embodiments, the solutions may be pruned by a load balancer that selects a mapping solution based on the current loading on the nodes that are mapped to the service functions in the chain.

In some embodiments, the computing of a solution (or set of solutions) for an SFC request may be a non-deterministic polynomial-time hard (NP-hard) problem. In some cases, more complicated SFC requests (e.g., mesh requests) may be divided into multiple sequential SFC requests, and the results may subsequently be merged back together in order to satisfy these requests.

In at least some embodiment of the present disclosure, a vertex value data structure and a controller message format may be defined for a vertex-centric distributed computing approach for solving service function chaining in multi-domain networks. Note that this vertex data structure and message format may be specific for this particular distributed computing problem. Table 1 below illustrates an example vertex value data structure for use in this context, according to at least one embodiment.

TABLE 1

Vertex Value vertexID (the current vertex ID
$\{f_i\}$: a set of service functions available at the vertex
a set of resources at the vertex (e.g., VMs, storage, etc.)

In this example, the vertex value data structure includes a vertex identifier, a set of service functions that are available at the vertex, and a set of resources available at the vertex (which may include compute and/or storage resources). In some embodiments, the set of service functions that are available at the vertex may be a subset of the service functions that are supported in the multi-domain network or may be a subset of the service functions that are implemented at the vertex (e.g., if some of the service functions are not currently available for inclusion in an SFC request solution). Table 2 below illustrates an example controller message format for use in this context, according to at least one embodiment.

TABLE 2

Controller Message Format requestID
the current chain

In this example, each message exchanged as part of a vertex-centric distributed computation for identifying solutions to an SFC request in a multi-domain network may include an identifier of the SFC request, and the current SFC chain (which may be a partially mapped chain or a completed chain, in different controller messages).

In at least some embodiments, the vertex-centric distributed SFC algorithm that is applied to identify all possible SFC solutions for a given SFC request may include three major components: the vertex value, the message format, and the compute( ) function, examples of which are shown in Table 1, in Table 2 above, and in the pseudo-code below, respectively. As shown in Table 2, which describes an example of the message format, the current chain may include a sequence of elements of the form <vertexID, nextVertexID, edge info>, each representing a vertex with a particular vertexID that may have been mapped to a corresponding function. In these elements, empty brackets (shown as < >) may indicate that the corresponding function has not yet been mapped to a vertex. In at least some embodiments, the vertices and their corresponding functions must maintain the same order in the chain. The nextVertexID indication in each element of the sequence may be used for ordering mapped vertices in the chain.

In some embodiments, the value of the vertexID for a given vertex may be assigned by its local resource orchestrator, and may be unique within its domain. In some embodiments, to distinguish between vertices in different domains, the vertexID may include an identifier of the domain or its resource orchestrator. In other embodiments, within controller messages exchanged between vertices, the vertexID may be augmented with an identifier of the domain or its resource orchestrator. In some embodiments, the value of the SFC request identifier may be assigned by the source resource orchestrator when the SFC request is received or when the source resource orchestrator sends a controller message that includes the SFC request to the other resource orchestrators in the multi-domain network.

One example embodiment of a compute( ) function to be executed at various vertices (nodes) in a vertex-centric distributed service function chaining algorithm is illustrated by the pseudo-code below. In this example, the compute function performs operations during the first superstep (superstep 0) that are not performed during one or more subsequent supersteps. compute( )

```
if (superstep == 0 && vertexisQualified( )){
    for each neighbor{
        if (edge.isQualified( )){
            generate a chain with the vertex mapped to the function;
            send the chain to the neighbor;}}}
for each message received{
    if (vertex.isQualified( )) {
        if (all functions in the chain are mapped) {
            emit the completed chain to the source orchestrator;}
        else {
            for each neighbor{
                if (edge.isQualified( )){
                    generate the chain with the vertex mapped to the function;
                    send the chain to the neighbor;}}}
```

In the example embodiment illustrated above, the compute function may call (or otherwise invoke) a vertex.isQualified( ) method to determine whether or not the particular vertex on which the compute function executes is a qualified vertex. In this example embodiment, for each neighbor vertex of the particular vertex, the compute function may also call (or otherwise invoke) an edge.isQualified( ) method to determine whether or not the link between the particular vertex on which the compute function executes and one of its neighbor vertices is a qualified link. If, for one or more of the neighbor vertices, both of these methods return True, the current vertex may extend the chain (by mapping itself to a service in the chain and including a link to the neighbor vertex) and may send the extended chain to that neighbor vertex in a controller message. In this example, if the vertex.isQualified( ) method returns False, the vertex.isQualified( ) method may not be called for any of the neighbor vertices. In this example, if the vertex.isQualified( ) method returns True, the current chain may be extended and controller messages may be sent only to those neighbor vertices with which the current vertex has a qualified connection (where the edge.isQualified( ) method returns True). In at least some embodiments, if, during superstep 0, no qualifying vertices are found, the distributed computation may stop without returning any feasible solutions. Similarly, if, during a subsequent superstep, none of the partially mapped chains generated by qualified vertices can be completed, the distributed computation may stop without returning any feasible solutions.

In various embodiments, the method vertex.isQualified( ) may call one or more other methods to determine whether or not the particular vertex on which the compute function executes is a qualified vertex. In one example, the method vertex.isQualified( ) may call a method vertex.hasFunction( ) which determines whether or not the current vertex is capable of performing a given service function that can begin, extend, or complete the requested service function chain. In another example, the method vertex.isQualified( ) may call a method vertex.hasResource( ) that determines whether or not the current vertex has enough capacity available to perform the given service function (e.g., whether or not a compute and/or storage resource needed to implement the given service function is available at the current vertex). In yet another example, the method vertex.isQualified( ) may call a method vertex.hasVMs( ), which, more specifically, determines whether or not the current vertex includes enough available VMs to implement the given service function. Still other methods may be called as part of qualifying the particular vertex on which the compute function executes, in different embodiments. In some embodiments, both a vertex.hasFunction( ) method and another method that determines whether or not required resources are available at the vertex (such as a vertex.hasResource( ) method or a vertex.hasVMs( ) method) may need to return True in order for the vertex.isQualified( ) method to return True.

Similarly, in some embodiments, the method edge.isQualified( ) may call one or more other methods to determine whether or not the link between the particular vertex on which the compute function executes and one of its neighbor vertices is a qualified link. In one example, the method edge.isQualified( ) may call a method edge.hasBW( ), which determines whether or not the link between the particular vertex on which the compute function executes and its neighbor vertex has sufficient bandwidth to extend the chain to the neighbor vertex. In another example, the method edge.isQualified( ) may call a method edge.delayOK( ), which determines whether or not the delay over the link between the particular vertex on which the compute function executes and its neighbor vertex meets delay requirements for extending the chain to the neighbor vertex (e.g., that the link has a delay that is within an acceptable range specified for the requested SFC). Still other methods may be called as part of qualifying the link between the particular vertex on which the compute function executes and one of its neighbors, in different embodiments. In some embodiments, the method edge.isQualified( ) may call two or more methods, all of which may need to return True in order for the edge.isQualified( ) method to return True.

Figure 7A:
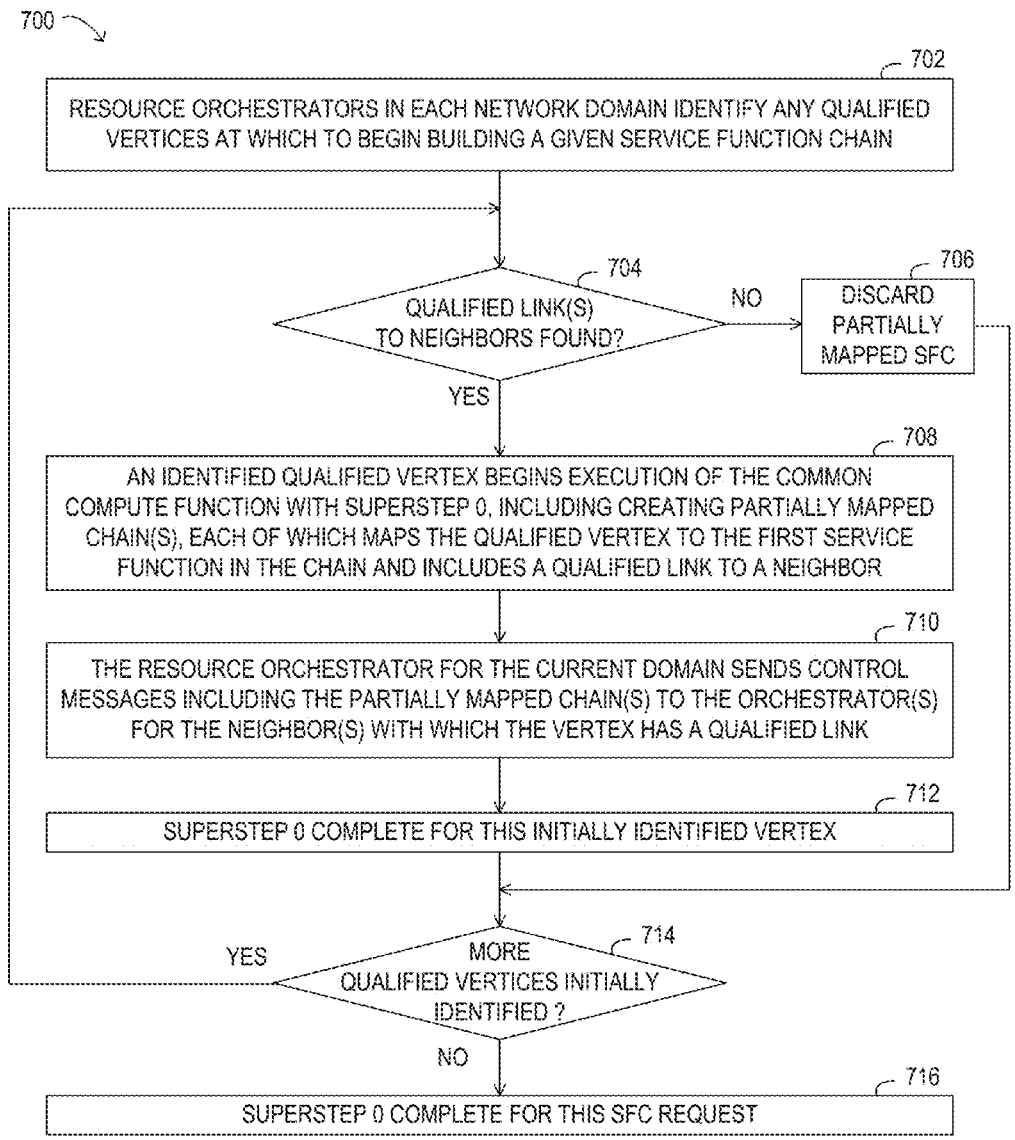
FIGS. 7A and 7B illustrate selected elements of an example method for performing a compute( ) function, according to one embodiment.
Figure 7B:
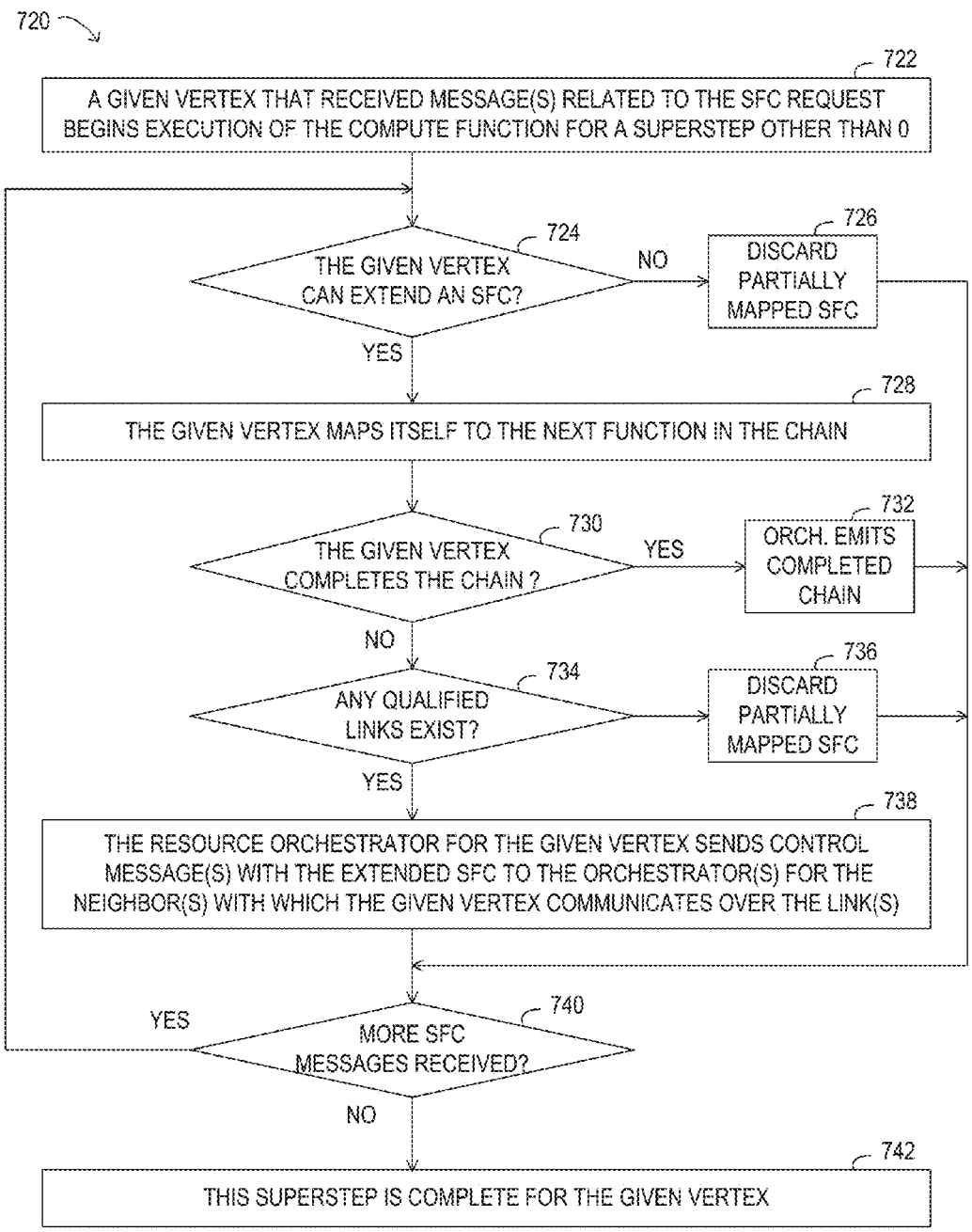

FIGS. 7A and 7B illustrate selected elements of an example method for performing a compute( ) function, such as that described above. More specifically, FIG. 7A illustrates selected elements of a method 700 for performing superstep 0 of the compute function, according to one embodiment. In this example embodiment, during superstep 0, each qualified vertex sends a message to each potentially qualified neighbor (neighbors that have qualified links to the qualified vertex and that may also include the next service function in the requested service function chain). In this example embodiment, the method includes (at 702) the resource orchestrators in each network domain identifying any qualified vertices at which to begin building a given service function chain. For example, a source resource orchestrator in one domain may send a controller message that includes an SFC request to the respective resource orchestrators for one or more other domains, each of which may identify any vertices (nodes) in its domain that include the first service function in the requested service function chain. Each vertex that is identified as a qualified vertex may be mapped to the first service function in a respective partially mapped service function chain.

In this example embodiment, the method includes (at 704), determining whether there are any qualified links between the given vertex and its neighbors (links in the physical infrastructure that meet bandwidth and/or delay requirements for the requested service function chain). If not, the method includes discarding the partially mapped service function chain that includes the identified qualified vertex (as in 706). If (at 704) one or more qualified links between the given vertex and its neighbors is found, the method includes (at 708) one of the identified qualified vertices beginning execution of the common compute function with superstep 0, including, for any qualified links from the qualified vertex to a neighbor, creating a partially mapped chain that maps the qualified vertex to the first service function in the chain and includes the qualified link to the neighbor. In some embodiments (e.g., when a neighbor with a qualified link is in a different domain than the qualified vertex), the method also includes (at 710) the resource orchestrator for the current domain sending a control message that includes the partially mapped chain(s) to the orchestrator(s) for the neighbor(s) with which the vertex has a qualified link, after which superstep 0 is complete for this initially identified qualified vertex (as in 712). In some embodiments in which a neighbor with a qualified link is in the same domain as the qualified vertex, the domain controller may not send a control message to any other orchestrator, but may handle the next superstep for that neighbor itself. In other embodiments in which a neighbor with a qualified link is in the same domain as the qualified vertex, messages may be exchanged between the two vertices through writes to and reads from a memory.

In this example embodiment, if (as shown in 714) there were more qualified vertices initially identified (at step 702), the operations shown in 704-712 may be repeated, as appropriate, for each additional one of the initially qualified vertices. If, or once (at 714) there are no more qualified vertices that were initially identified to process, superstep 0 may be complete for this service function chain request (as in 716). Note that while FIG. 7A illustrates an embodiment in which the operations shown in 704-712 are performed for each initially identified qualified vertex in series, in at least some embodiments of the present disclosure, these operations may be performed substantially in parallel for each of the initially identified qualified vertices.

FIG. 7B illustrates selected elements of a method 720 for performing supersteps of the compute function described above other than superstep 0, according to one embodiment. More specifically, FIG. 7B illustrates the actions taken on one vertex that receives a controller message including a partially mapped SFC for an SFC request (which may or may not be able to be extended or completed by a service function on the given vertex). In this example embodiment, the method includes (at 722) a given vertex that received one or more such controller messages beginning execution of the compute function for a superstep other than superstep 0 (e.g., for the superstep following the superstep in which the controller message was sent to the given vertex). The method includes (at 724) determining whether the received controller message includes a partially mapped service function chain that can be extended (or completed) by a service function available at the given vertex. If it is determined that the received controller message includes a partially mapped service function chain that cannot be extended (much less completed) by a service function available at the given vertex, the method includes discarding the partially mapped SFC that was included in the received message (as in 726).

If (at 724) it is determined that the received controller message includes a partially mapped service function chain that can be extended by a service function available at the given vertex, the method includes (at 728) the given vertex mapping itself to the next function in the chain. The method also includes (at 730) determining whether or not the mapping of the given vertex to the next function in the chain completes the requested service function chain. If so, the mapping is completed for this candidate SFC, and the method includes the orchestrator for the domain in which the given vertex resides emitting the completed chain to the source resource orchestrator (as in 732).

If (at 730) it is determined that the partially mapped SFC in the received controller message is not completed by mapping of the given vertex to the next function in the chain, the method may include continuing the attempt to identify a potential candidate solution for the SFC request. In the example embodiment illustrated in FIG. 7B, this includes (at 734) determining whether or not there are any qualified links between the given vertex and its neighbors (links in the physical infrastructure that meet bandwidth and/or delay requirements for the requested service function chain). If not, the method includes discarding the partially mapped service function chain that includes the identified qualified vertex (as in 736). If (at 734) one or more qualified links between the given vertex and its neighbors is found (and if any of the neighbors with qualified links are in a different domain than the given vertex), the method includes the resource orchestrator for the given vertex sending a respective control message with the extended SFC to the orchestrator for each of the neighbor(s) in other domains with which the given vertex communicates over the qualified link(s). In some embodiments in which a neighbor with a qualified link is in the same domain as the given vertex, the domain controller may not send a control message to any other orchestrator, but may handle the next superstep for that neighbor itself. In other embodiments in which a neighbor with a qualified link is in the same domain as the given vertex, messages may be exchanged between the two vertices through writes to and reads from a memory.

If (as shown at 740) more controller messages related to the SFC request were received by the given vertex, the operations shown as 724-738 may be repeated, as appropriate, for each additional message that was received. If, or once (at 740), there are no additional received messages to process, this superstep is complete for the given vertex (as shown in 742).

In the example embodiment described above, during each superstep other than superstep 0, the operations shown in FIG. 7B are repeated for each vertex that received a controller message from a resource orchestrator in the previous superstep. In at least some embodiments, during each superstep, the operations shown in FIG. 7B may be performed substantially in parallel for each vertex that received a controller message from a resource orchestrator in the previous superstep. As previously noted, the total number of supersteps performed by the compute function in response to a service function chain request may be equal to number of service functions included in the requested service function chain.

In the example illustrated in FIGS. 7A and 7B, during superstep 0, the compute function is executed to identify any vertices (nodes) on which the first service function in an SFC request can be performed and to send a partially mapped chain to its neighbor vertices (nodes) with which it has qualifying links. During superstep 1, the compute function is executed to identify any of those neighbor vertices (nodes) on which the second service function in the SFC request can be performed and to send an extended partially mapped chain to their neighbors (i.e., to the neighbors of the neighbors), if there are qualifying links to those neighbor vertices (nodes). During superstep 2, the compute function is executed to determine whether the neighbors of the neighbors can complete the chain by adding a mapping for the third service function in the SFC request, and to return any completed chains to the source resource requestor. This example shows that, in at least some embodiments, the number of supersteps will be equal to the number of service functions in the SFC request, illustrating the scalability of this approach.

In some embodiments, messages exchanged between a pair of resource orchestrators at a particular superstep may be combined. However, in at least some embodiments, the physical nodes may not communicate with each other during distributed computing (e.g., when performing the functions of the SFC or of another type of distributed operation or computation).

Figure 8B:
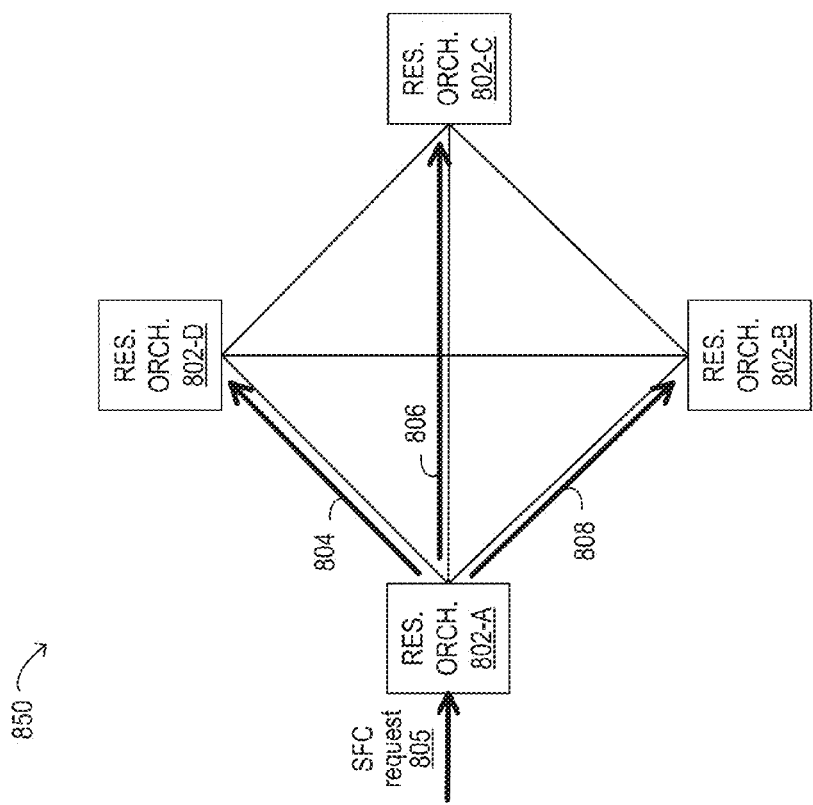
Figure 8A:
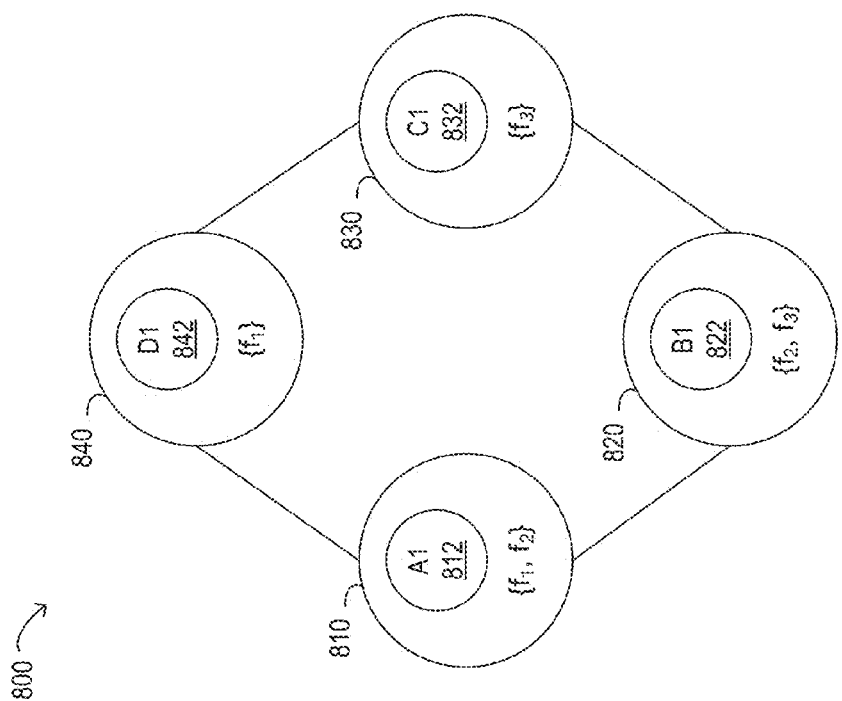

FIGS. 8A-8J illustrate an example of vertex-centric distributed computing for generating one or more candidate solutions to a service function chain request, according to one embodiment. More specifically, they depict an example of vertex-centric distributed computing for a fixed-ordered SFC request $f_1 \cdot f_2 \cdot f_3$ that has a request ID=1. In this example, FIG. 8A presents a multi-domain network 800 that includes four domains (A, B, C, and D), shown as domains 810, 820, 830, and 840, respectively. In this example, each domain includes a single node (A1 812, B1 822, C1 832, and D1 842, respectively), and each node has a set of service functions that is a subset of all the available service functions in the multi-domain network. In this example, node A1 (812) in domain A (810) includes service functions $f_1$ and $f_2$, node B1 (822) in domain B (820) includes service functions $f_2$ and $f_3$, node C (832) in domain C (830) includes service function $f_3$, and node D1 (842) in domain D (840) includes service function $f_1$.

In this example, the service function request is for a fixed order chain $f_1 \cdot f_2 \cdot f_3$. While not all of the nodes include all of the service functions included in the requested service function chain, in this example (for simplicity of illustration), is it assumed that all of the nodes (vertices) and edges (links) meet the other qualifying requirements for the requested service function chain. More specifically, it is assumed that the number of compute and/or storage resources required for each of the supported service functions are available on each node (vertex), and that bandwidth and/or delay requirements are met for all of the edges (links) between the neighboring nodes that include the service functions to be mapped as part of a candidate solution for the service function chain request. For example, all of the delays between neighboring nodes (and service functions) in domains A 810 and D 840, domains D 840 and C 830, domains C 830 and B 820, and domains A 810 and B 820 are assumed to be 1.

FIGS. 8B-8J illustrate the operations of the vertex-centric distributed computing on a distributed resource orchestration architecture 850. The distributed resource orchestration architecture 850 includes the communication channels (or links) over which controller messages are exchanged between the respective resource orchestrators of the domains A 810, B 820, C 830, and D 840 illustrated in FIG. 8A. These resource orchestrators are shown as resource orchestrator A (802-A), resource orchestrator B (802-B), resource orchestrator C (802-C), and resource orchestrator D (802-D), respectively. In this example, an SFC request 805 is submitted to resource orchestrator A (802-A). This resource orchestrator may be (or serve as) a source orchestrator, which may be the resource orchestrator for a master domain in the multi-domain network. As the source orchestrator, resource orchestrator A (802-A) forwards the SFC request 805 to the other three resource orchestrators in the distributed resource orchestration architecture 850. This is shown by the bold arrow 804 from resource orchestrator A (802-A) to resource orchestrator D (802-D), the bold arrow 806 from resource orchestrator A (802-A) to resource orchestrator C (802-C), and the bold arrow 808 from resource orchestrator A (802-A) to resource orchestrator B (802-B). Each of the resource orchestrators may then identify any qualified vertices with which to start building a candidate solution for SFC request 805. For example, since SFC request 805 includes a fixed-ordered chain, each resource orchestrator may identify any vertices within their respective domains that include the first function in SFC request 805 (i.e., service function $f_1$). In this example, the initially identified qualified vertices include node A1 (810) and node D1 (840). Note that, in this example, it is assumed that nodes A1 and D1 have sufficient resource for performing service function $f_1$, and so they are qualified nodes.

In this example, during superstep 0, each vertex (node) that was identified as having the first function $f_1$, in this case, nodes A1 (810) and D1 (840) executes a portion of a compute function such as that described above. In this case, for each of its neighbors, each of these vertices generates partially mapped SFC in which the vertex itself is mapped to the first function in the chain, and in which the partially mapped SFC includes a qualified link to a neighbor. The resource orchestrator for the domain in which the vertex resides then sends an appropriate controller message containing one of the partially mapped SFCs to each of those neighbors. For example, FIG. 8C illustrates that, because node A1 (812) in domain A (810) includes service function $f_1$ (which is the first service function in the requested service function chain), and has qualified links to node B1 (822) in domain B (820) and node D1 (842) in domain D (840), it creates two partially mapped chains in which node A1 is mapped to the first function in the SFC and is linked to either node B1 or node D1, respectively.

In this example, resource orchestrator A (802-A) sends a controller message 854 to the resource orchestrator B (802-B) for domain B (820). Controller message 854 includes the SFC request identifier (1) and the partially mapped chain (<A1, B1, 1>•< >•< >). The values within the first bracket in the controller message indicate that node A1, which is the first item, is the vertex that maps to the first service function $f_1$, and that node B1 is the vertex to which the partially mapped chain is sent over a link with a delay value of 1. Since the other service functions in the SFC request are not yet mapped, the partially mapped service function chain included in controller message 854 includes two empty brackets. Similarly, resource orchestrator A (802-A) sends a controller message 852 to the resource orchestrator D (802-D) for domain D (840). Controller message 852 includes the SFC request identifier (1) and the partially mapped chain (<A1, D1, 1>•< >•< >). The values within the first bracket in the controller message indicate that node A1, which is the first item, is the vertex that maps to the first service function $f_1$ and that node D1 is the vertex to which the partially mapped chain is sent over a link with a delay value of 1.

Since the other service functions in the SFC request are not yet mapped, the partially mapped service function chain included in controller message 852 includes two empty brackets.

Figure 8D:
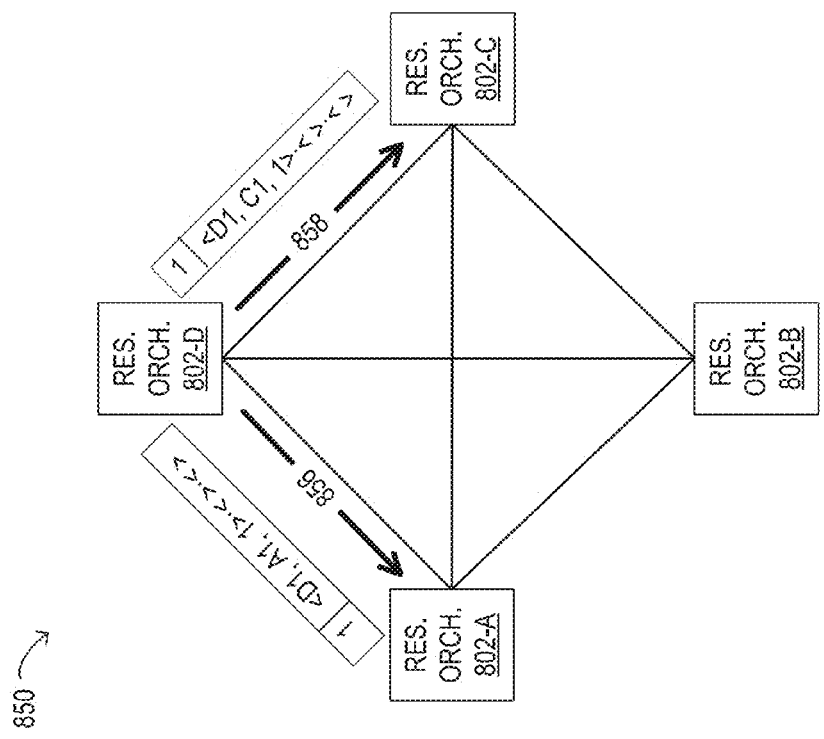
Figure 8C:
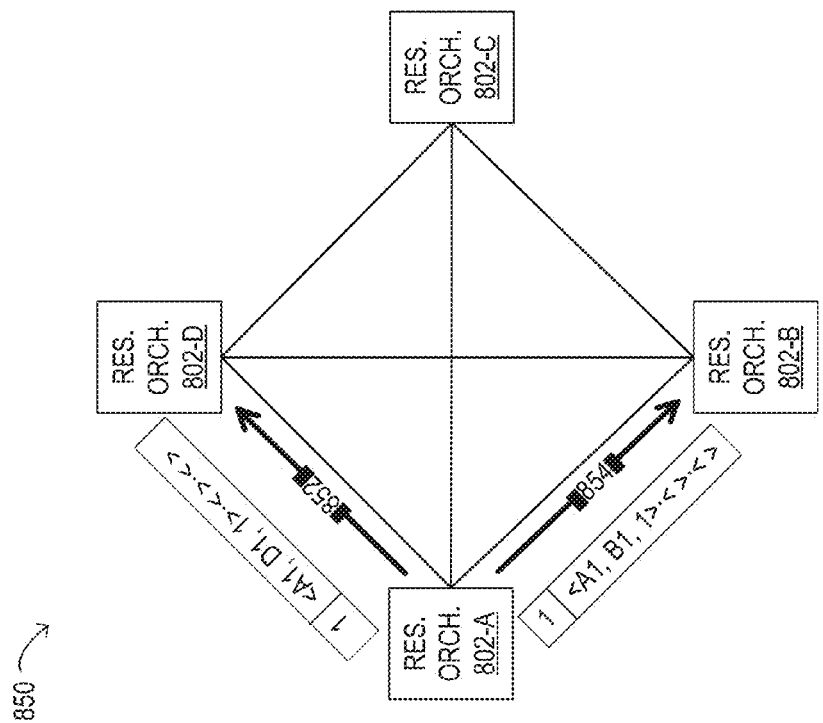

FIG. 8D illustrates that, in superstep 0, because node D1 (842) in domain D (840) includes service function $f_1$ (which is the first service function in the requested service function chain), and has qualified links to node A1 (812) in domain A (810) and node C1 (832) in domain C (830), it creates two partially mapped chains in which node D1 is mapped to the first function in the SFC and is linked to either node B1 or node D1, respectively. In this example, resource orchestrator D (802-D) sends a controller message 856 to the resource orchestrator A (802-A) for domain A (810). Controller message 856 includes the SFC request identifier (1) and the partially mapped chain (<D1, A1, 1>•< >•< >). The values within the first bracket in the controller message indicate that node D1, which is the first item, is the vertex that maps to the first service function $f_1$, and that node A1 is the vertex to which the partially mapped chain is sent over a link with a delay value of 1. Since the other service functions in the SFC request are not yet mapped, the partially mapped service function chain included in controller message 856 includes two empty brackets. Similarly, resource orchestrator D (802-D) sends a controller message 858 to the resource orchestrator C (802-C) for domain C (830). Controller message 858 includes the SFC request identifier (1) and the partially mapped chain (<D1, C1, 1>•< >•< >). The values within the first bracket in the controller message indicate that node D1, which is the first item, is the vertex that maps to the first service function $f_1$, and that node C1 is the vertex to which the partially mapped chain is sent over a link with a delay value of 1. Since the other service functions in the SFC request are not yet mapped, the partially mapped service function chain included in controller message 858 includes two empty brackets.

Figure 8F:
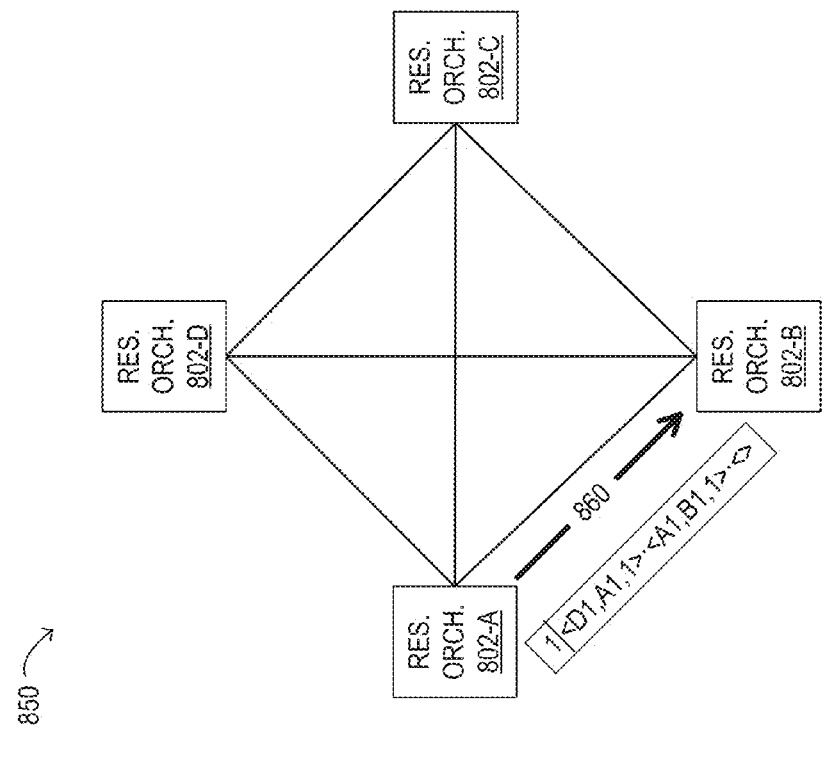
Figure 8E:
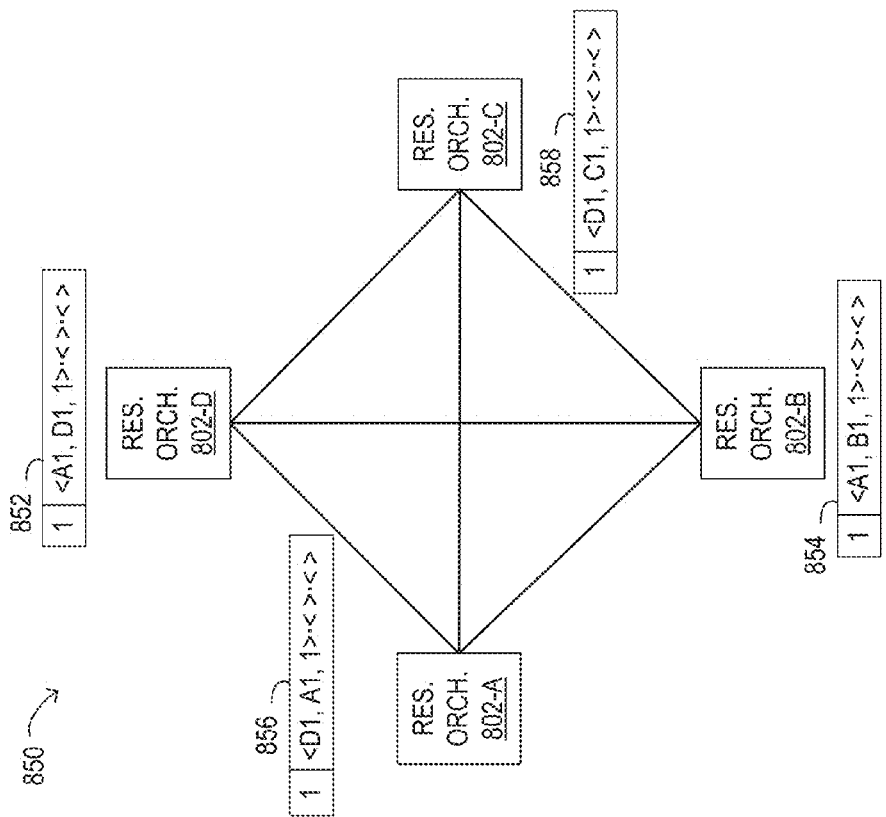

In this example, since neither node B1 (822) nor C1 (832) includes service function $f_1$ (which is the first service function in the requested service function chain), these nodes are not qualified nodes and no controller messages are sent from their respective resource orchestrators to the resource orchestrators of their neighbors during superstep 0. Once all of the vertices (nodes) have received the controller messages that they are supposed to receive, superstep 0 ends. FIG. 8E illustrates that, at the end of the superstep 0, four controller messages containing partially mapped service function chains have been delivered to destination vertices. More specifically, node A1 has received controller message 852, node B1 has received controller message 854, node C1 has received controller message 858, and node D1 has received controller message 858, all of which are described above.

As described above, during supersteps other than superstep 0, each vertex (node) that received a controller message related to the SFC request during the previous superstep processes those messages and determines whether or not the partially mapped service function chains in those messages can be extended or completed. For example, FIG. 8F illustrates that, during superstep 1, node A1 (which received a partial chain <D1, A1, 1>•< >•< >) is able to extend the chain to <D1, A1, 1>•<A1, B1, 1>•< >, since the function $f_2$ (the second function in the requested service function chain) is available at node A1 (812), and node A1 has a qualified link to its neighbor node B1 (822). In this example, resource orchestrator A (802-A) sends a controller message 860 that includes this extended service function chain to the resource orchestrator for node B1 (resource orchestrator B, 802-B) that includes the extended service function chain.

Figure 8H:
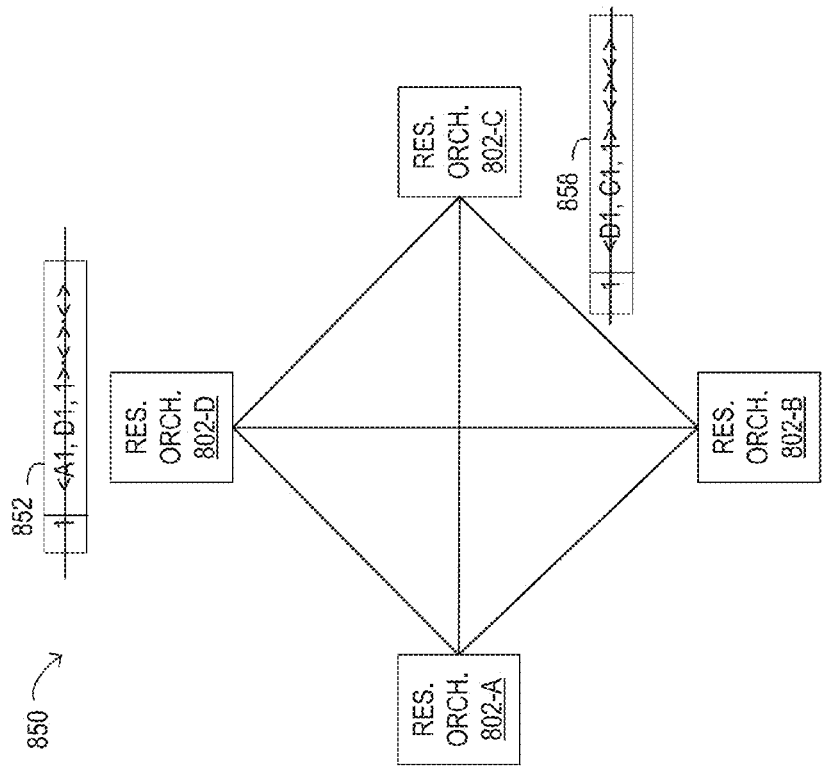
Figure 8G:
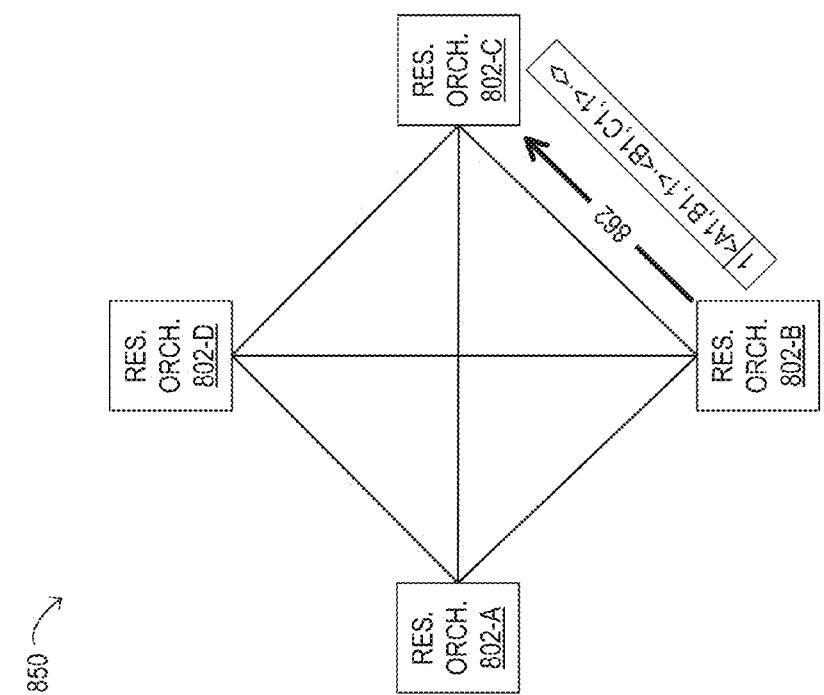

Similarly, FIG. 8G illustrates that, during superstep 1, node B1 (which received a partial chain <A1, B1, 1>•< >•< >) is able to extend the chain to <A1, B1, 1>•<B1, C1, 1>•< >, since the function $f_2$ (the second function in the requested service function chain) is available at node C1 (832), and node B1 has a qualified link to its neighbor node C1 (832). In this example, resource orchestrator B (802-B) sends a controller message 862 that includes this extended service function chain to the resource orchestrator for node C1 (resource orchestrator C, 802-C) that includes the extended service function chain.

In this example, during superstep 1, vertex (node) D1 842 discards the partially mapped chain <A1, D1, 1>•< >•< > that it received in controller message 852 since the function $f_2$ that extends the chain is not available at node D1 (which disqualifies node D1). Similarly, during superstep 1, vertex (node) C1 832 discards the partially mapped chain <D1, C1, 1>•< >•< > that it received in controller message 858 since the function $f_2$ that extends the chain is not available at node C1 (which disqualifies node C1). This is illustrated in FIG. 8H.

Once all of the vertices (nodes) have received the controller messages that they are supposed to receive during superstep 1, superstep 1 ends. FIG. 8I illustrates that, at the end of the superstep 1, two remaining controller messages containing partially mapped service function chains have been delivered to destination vertices. More specifically, node B1 has received controller message 860, and node C1 has received controller message 862, both of which are described above.

During superstep 2 (illustrated in FIG. 8J), since both vertex B and vertex C have the last required service function for the requested service function chain (service function $f_3$), each of them may complete a respective candidate solution for the requested service function chain and may send the completed service function chain back to the source orchestrator. For example, vertex (node) C1 832 (which received a partial chain <A1, B1, 1>•<B1, C1, 1>•< >) is able to extend and complete the chain as <A1, B1, 1>•<B1, C1, 1>•<C1,> by mapping itself to the third service function in the chain. In this example, resource orchestrator C (802-C) sends a controller message 866 to the source resource orchestrator (resource orchestrator A, 802-A) that includes the completed service function chain. Similarly, vertex (node) B1 822 (which received a partial chain <D1, A1, 1>•<A1, B1, 1>•< >) is able to extend and complete the chain as <D1, A1, 1>•<A1, B1, 1>•<B1,> by mapping itself to the third service function in the chain. In this example, resource orchestrator B (802-B) sends a controller message 864 to the source resource orchestrator (resource orchestrator A, 802-A) that includes the completed service function chain. Once controller message 866 and controller message 864 have been delivered to the source resource orchestrator, superstep 2 (and the distributed computation as a whole) are complete.

In the example vertex-centric distributed computation illustrated in FIGS. 8A-8J, there were two possible service function chain solutions found and communicated back to the source orchestrator. One service function chain goes from node D1 (to perform service function $\beta_1$) to node A1 (to perform service function $f_2$) to node B1 (to perform service function $f_3$). The other service function chain goes from node A1 (to perform service function $f_1$) to node B1 (to perform service function $f_2$) to node C1 (to perform service function $f_3$). In this example, the source orchestrator may thus receive two possible solutions for SFC request 805: D1•A1•B1 and A1•B1•C1.

While the example illustrated in FIGS. 8A-8J and described above involves a fixed-ordered SFC request, the vertex-centric distributed computing approach described herein may also be suitable for application to flexible-ordered SFC requests, in some embodiments. In cases in which an SFC request includes a flexible-ordered service function chain, in at least some supersteps, the compute function executed at each superstep may perform multiple searches in parallel, each of which attempts to identify one of multiple options for extending or completing a partially mapped chain. In this case, the vertex-centric distributed computation will have the same number of supersteps as would be performed for a fixed-ordered SFC request in which the service function chain has the same number of service functions, but it will exchange more messages during each superstep than in the fixed-ordered case.

In the case of a flexible-ordered SFC request, in at least some embodiments, a vertex.hasFunction( ) method (such as one called by a vertex.isQualified( ) method) may be able to compute the function that is used to extend the chain based on the current chain. For example, for an SFC request $f_1$*$f_2$*$f_3$, a vertex B with a service function $f_1$ may receive a controller message that includes a partially mapped chain < >*<A, B, 1>*< >. This chain may carry two pieces of information: the fact that vertex A maps to service function $f_2$, and an indication that the service function that extends the chain can be either service function $f_1$ or service function $f_3$. In this example, since vertex B has service function $f_1$, it is able to map to $f_1$ in the chain, extending the chain to become <B,>*<A, B, 1>*< >. In this example, vertex C may then receive a controller message that includes the partially mapped chain <B, C, 1>*<A, B, 1>*< >. Based on this controller message, vertex C knows that vertex A maps to service function $f_2$, that vertex B maps to service function $f_1$, and that the ordering of service functions in this candidate solution (so far) is $f_2$•$f_1$. Therefore, vertex C may complete the chain if it has service function $f_3$.

In some cases, an SFC request may include a service function chain in which the ordering is flexible for some of the service functions, but not others. In at least some embodiments, the vertex-centric distributed computing approach described herein may be used to identify any potential solutions for these types of SFC requests, as well. For example, for a service function chain request ($f_1$*$f_2$*$f_3$) •$f_4$, the first set of service functions to mapped is {$f_1$, $f_2$, $f_3$}. That is, any vertex associated with any service function in the set {$f_1$, $f_2$, $f_3$} can map to the associated service function. For a partially mapped chain in which service function $f_1$ has already been mapped, the next set of service functions to be mapped is {$f_2$, $f_3$}, and so on. Once all of the service functions in the set {$f_1$, $f_2$, $f_3$} have been mapped, service function $f_4$ is mapped. In another example, for a chain for a service function chain request $f_4$• ($f_1$*$f_2$*$f_3$), the first service function that can be mapped is service function $f_4$, and any vertex with the service function $f_4$ should map to service function $f_4$ first. In this example, after service function $f_4$ is mapped, then the service functions in the set {$f_1$, $f_2$, $f_3$} in the chain can be mapped in any order.

Figure 9:
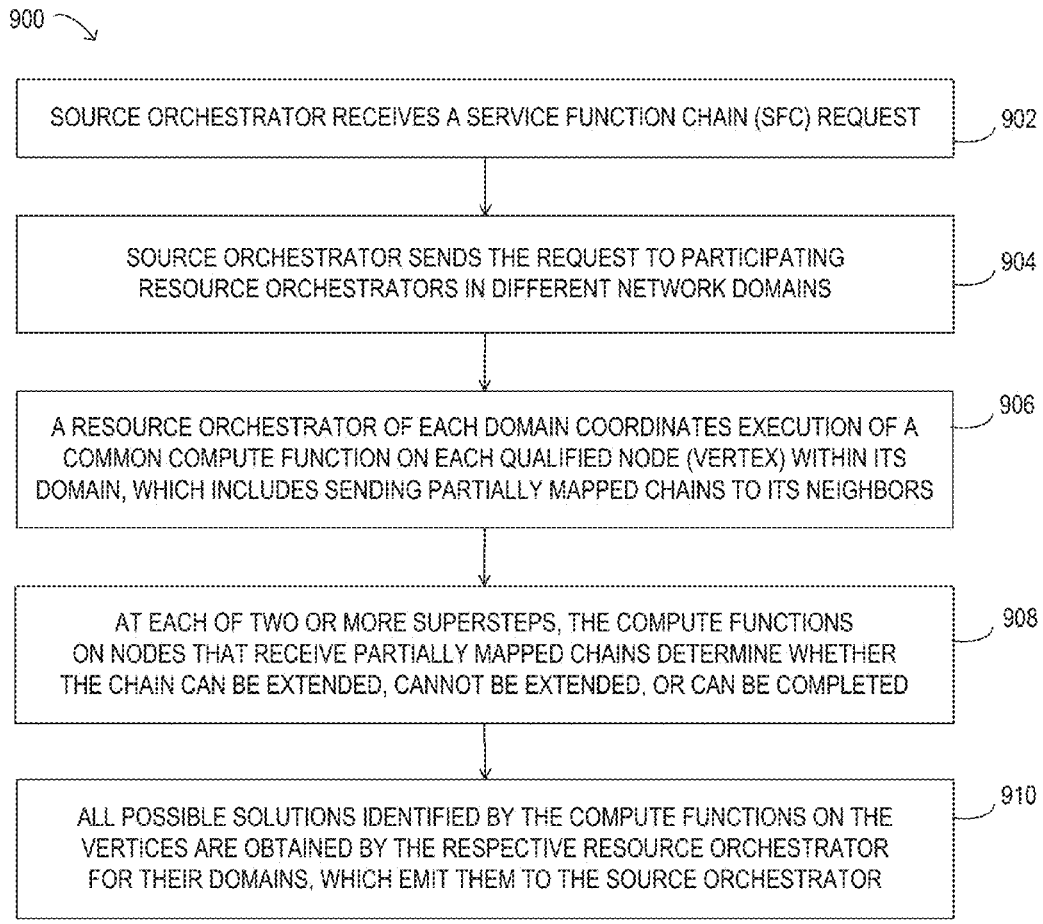
FIG. 9 is a flow diagram illustrating selected elements of a method for performing a vertex-centric distributed algorithm to identify all qualified solutions for a service function chain request in a multi-domain network, according to one embodiment.

FIG. 9 is a flow diagram illustrating selected elements of a method 900 for performing a vertex-centric distributed algorithm for identifying all qualified solutions for a service function chain request in a multi-domain network, according to one embodiment. In this example embodiment, the method includes (at 902) a source orchestrator receiving a service function chain (SFC) request. The method includes (at 904) the source orchestrator sending the request to participating resource orchestrators in different network domains.

In this example, the method includes (at 906) the resource orchestrators of each domain coordinating the execution of a common compute function on each qualified node (vertex) its domain (e.g., on each node that includes the first one of the service functions in a fixed-ordered chain or any one of the service functions in a flexible-ordered chain). This may include the qualified nodes sending partially mapped service function chains to their neighbor nodes. The method includes (at 908), at each of two or more supersteps, the compute function on these and other nodes that receive a partially mapped service function chain determining whether the chain can be extended, cannot be extended, or can be completed. The method also includes (at 910) all possible solutions identified by the compute functions on the vertices being obtained by the respective resource orchestrator for their domains, which emits them to the source orchestrator.

As previously noted, an objective of the vertex-centric distributed algorithm described herein is to identify all qualified solutions for an SFC request in a multi-domain network. In some embodiments, the results of this computation may be pruned to identify only those solutions that meet other criteria, according to policies of the service provider and/or requestor preferences. For example, in some embodiments, the potential solutions may be pruned to include only those potential solutions having a total cost that is below a specified total cost threshold or having a total delay that is below a specified total delay threshold. The total cost of a solution may be specified in terms of real costs (e.g., fiber costs or the cost of physical links) or in terms of bandwidth or delay, in different embodiments. In some embodiments, the potential solutions may be pruned to include only those potential solutions that meet multiple such constraints (e.g., constraints on two or more of: cost, delay, and/or bandwidth). In some embodiments, the selection of one or more of the potential solutions may be determined at runtime by a load balancer. In some embodiments, for protection purposes, the potential solutions may be pruned to include a set of potential solutions that include disjoint chains. For example, if the service function chains in the pruned set of potential solutions do not include any overlapping resources (e.g., no overlapping physical links or physical nodes), if one of the resources in a selected service function chain in the set becomes unavailable, it will not affect the availability of the other service function chains in the pruned set of potential solutions.

Figure 10:
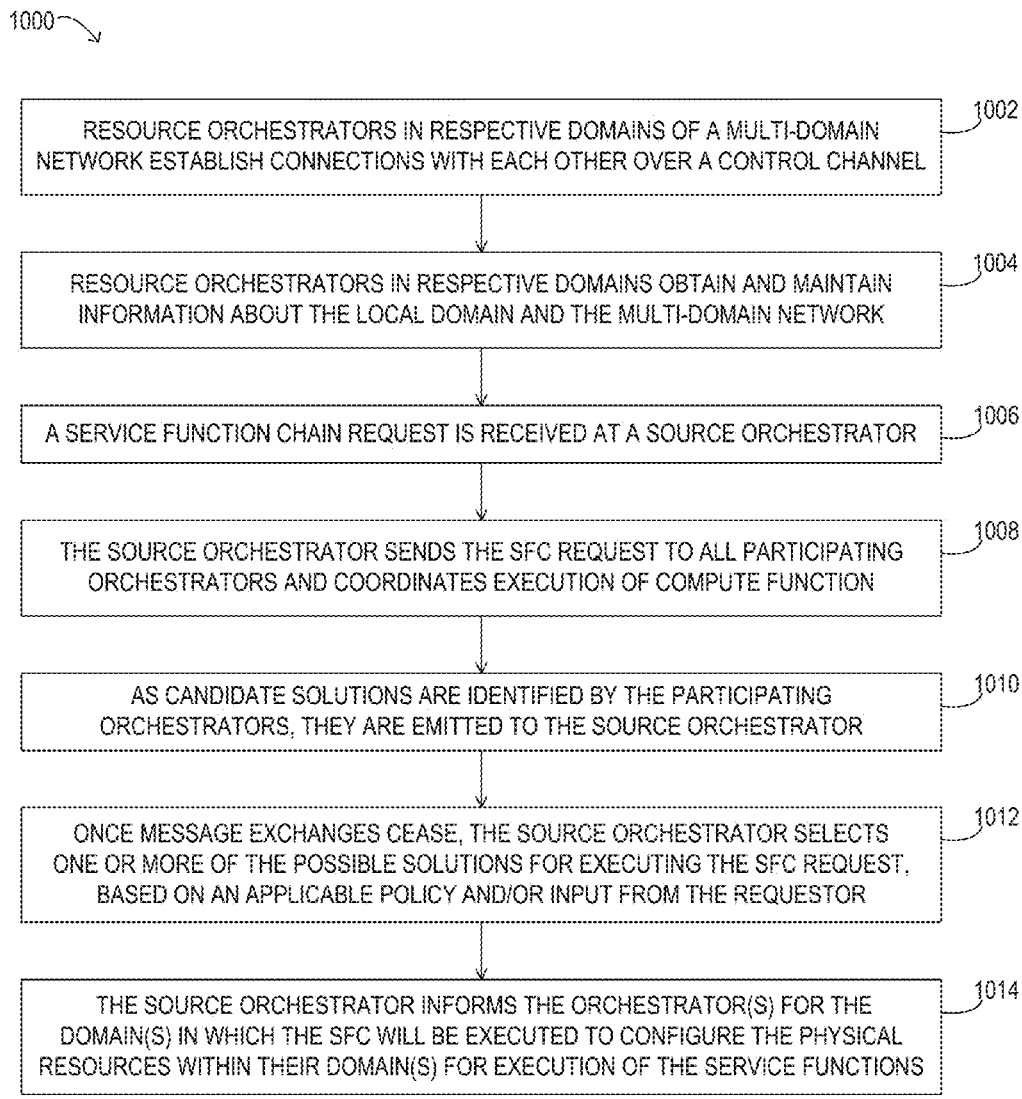
FIG. 10 is a flow diagram illustrating selected elements of a method for satisfying a service function chain request, according to one embodiment.

FIG. 10 is a flow diagram illustrating selected elements of a method 1000 for satisfying a service function chain request, according to one embodiment. In this example embodiment, the method includes (at 1002) the resource orchestrators in respective domains of a multi-domain network establishing connections with each other over a control channel. The method includes (at 1004) the resource orchestrators in the respective domains obtaining and maintaining information about their local domains and about the multi-domain network. For example, in some embodiments, the resource orchestrators may store this information in memory on the nodes on which they reside (e.g., in vertex value data structures, edge data structures, and/or other data structures). While coordinating a vertex-centric distributed computation to identify all qualified solutions for an SFC request in a multi-domain network, the local resource orchestrators may also maintain (e.g., in memory) information representing SFC requests, partially mapped service function chains, completed service function chains, or other information usable in computing solutions for the SFC request, in different embodiments.

In this example embodiment, the method includes (at 1006) receiving a service function chain (SFC) request at a source orchestrator. The method also includes (at 1008) the source orchestrator sending the SFC request to all participating orchestrators in the multi-domain network and coordinating the execution of a common compute function, as described herein. As candidate solutions are identified by the participating orchestrators (at 1010), the method includes emitting them to the source orchestrator. Once (at 1012) the message exchanges cease, the method includes the source orchestrator selecting one or more of the possible solutions for executing the SFC request, based on an applicable policy and/or input from the requestor. The method also includes (at 1014) the source orchestrator informing the orchestrator(s) for the domain(s) in which various service functions within the SFC will be executed to configure the physical resources within their domain(s) for execution of the those service functions.

While many of the example embodiments described herein are directed to the application of a vertex-centric algorithm for identifying all qualified solutions for an SFC request in a distributed multi-domain network, in other embodiments, this approach may be applied in a centralized system. For example, in a centralized system, a single resource orchestrator may include all of the node and link information for the whole multi-domain network, and the network may not be partitioned. In this example, the single resource orchestrator may coordinate the execution of a common compute function on appropriate ones of the vertices (nodes) in a series of supersteps to build up any potential solutions to an SFC request. In other words, in a centralized system, a single resource orchestrator may implement the functionality of all of the respective resource orchestrators in the distributed systems described above. In some embodiments of such a centralized system, rather than exchanging controller messages between vertices (nodes) over control channels, messages that include partially mapped chains may be exchanged between vertices (nodes) by writing then to and reading them from memory. As in the case of the distributed systems described above, once the single resource orchestrator has identified all feasible service function chains for satisfying an SFC request, the single resource orchestrator may present them to another process that decides, based on one or more policies or constraints, which one or more of the identified service chains to implement.

Figure 11:
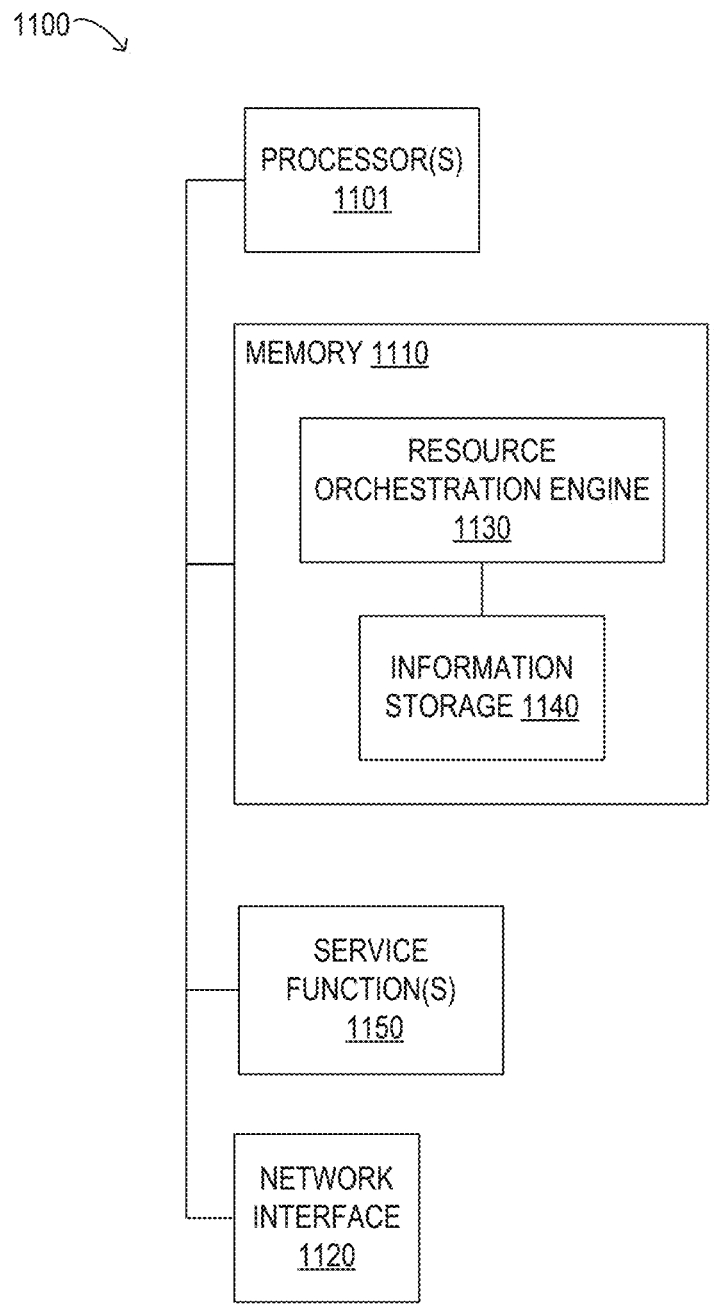
FIG. 11 is a block diagram of selected elements of an example network element, according to at least some embodiments.

Referring now to FIG. 11, a block diagram of selected elements of an example network element 1100 is illustrated, according to at least some embodiments. In FIG. 11, network element 1100 is represented as a computer system including physical and logical components for implementing any of the network elements in a multi-domain network. In various embodiments, a network element similar to network element 1100 may implement any of the network elements 112 illustrated in FIG. 1, any of the network elements illustrated in FIG. 2, any of the domain-specific resource orchestrators described herein (such as any of the resource orchestrators 108 illustrated in FIGS. 1, 3 and 4), any of the vertices (nodes) described herein, or a network controller (such as an SDN controller for a particular domain in a multi-domain network), as described herein. However, some of these network elements may not include all of the components illustrated in FIG. 11, in some embodiments. In other embodiments, any of the network elements described herein may include more, fewer, or different components than those included in the example embodiment illustrated in FIG. 11.

As illustrated in this example, network element 1100 may, accordingly, include one or more processors 1101, memory 1110, one or more service functions 1150, and a network interface 1120. Processor 1101 may represent one or more individual processing units and may execute program instructions, interpret data, and process data stored by memory 1110 or another component within network element 1100 to implement the functionality of any of the network elements described herein, in different embodiments. In this example embodiment, each service function 1150 may represent circuitry, logic, and/or program instructions for implementing any of a variety of service functions that may be included in a service function chain including, but not limited to, those described herein.

In FIG. 11, memory 1110 may be communicatively coupled to processor 1101 and may comprise a system, device, or apparatus suitable to retain program instructions and data for a period of time (e.g., non-transitory computer-readable media). Memory 1110 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 1110 may include different numbers of physical storage devices, in various embodiments.

As shown in FIG. 11, memory 1110 may include instructions to implement functionality of resource orchestration engine 1130. Resource orchestration engine 1130, in collaboration with other instances of resource orchestration engine 1130 on other instances of network element 1100, may implement a vertex-centric distributed algorithm for identifying all qualified solutions for an SFC request in a multi-domain network, and/or may implement any of the elements of method 700 illustrated in FIG. 7A, method 750 illustrated in FIG. 7B, method 900 illustrated in FIG. 9 and/or method 1000 illustrated in FIG. 10, in different embodiments, among other functionality described in the present disclosure. Memory 1110 may also include information storage 1140, which may store information usable by resource orchestration engine 1130 including, but not limited to, data representing an SFC request, node information (including data indicating the available compute and/or storage resources and/or service functions), edge information (e.g., in one or more edge data structures), vertex information (e.g., in one or more vertex value data structures), data representing one or more partially mapped service function chains, data representing one or more candidate solutions for a service function chain request (e.g., completed service function chains), data representing user resource usage preferences and policies, data representing inputs or outputs of a service function 1150, or values of any default or configurable parameters used to implement the functionality described herein or any other functionality of network element 1100.

Simulation Results

The vertex-centric computations for identifying all qualified SFC solutions in a multi-domain network described herein were simulated in an open source system. Specifically, the application of this approach to a 75-node Coronet network and to a 225-node customer network was simulated to determine its performance in different scenarios. In these simulations, the total number of service functions was fixed at ten, while the number of functions and the set of functions available at each vertex were randomly generated. The performance metrics observed for distributed systems included the signaling delay between resource orchestrators (e.g., the total communication delay during all supersteps, where the delay in a single superstep is the maximum delay between all communicating orchestrators in that superstep), the number of messages exchanged between resource orchestrators, and the total computation time for identifying all feasible solutions for an SFC request.

Distributed orchestrators were selected among physical network nodes with minimum average propagation delay and the orchestrators took turns to select the closest vertex, resulting in an even number of vertices among orchestrators. In these simulations, a single linear SFC request with randomly selected required functions was generated at a time. In the graphs shown in FIGS. 12A-12C, and in the descriptions thereof, V represents the total number of vertices in networks, D represents the number of network domains, and F represents the number of service functions in an SFC request. In these simulations, each vertex experienced a relatively short computation time at each superstep (around 2-10 milliseconds on average). Hence, the results presented in the figures are primarily focused on signaling delay and the size of messages between orchestrators.

Figure 12A:
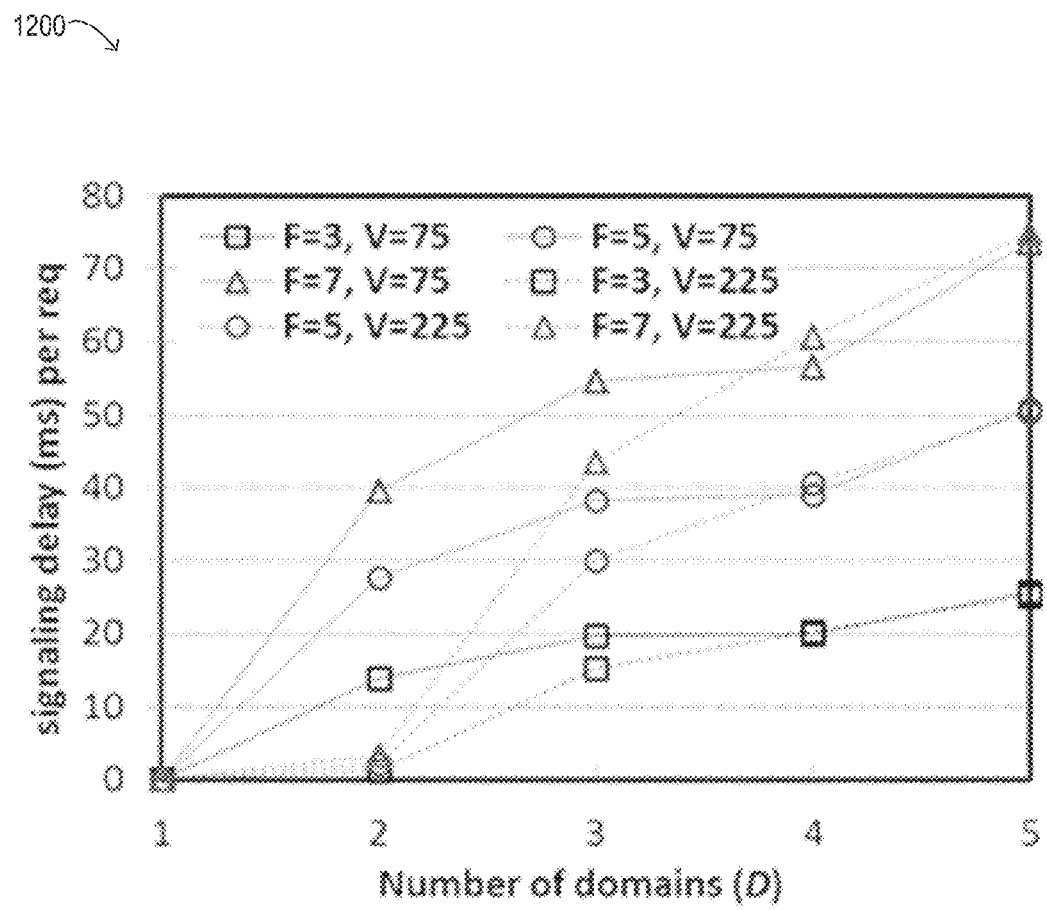
FIGS. 12A-12C illustrate selected results of simulations of the vertex-centric computations for identifying all qualified SFC solutions in a multi-domain network described herein, according to one embodiment.
Figure 12B:
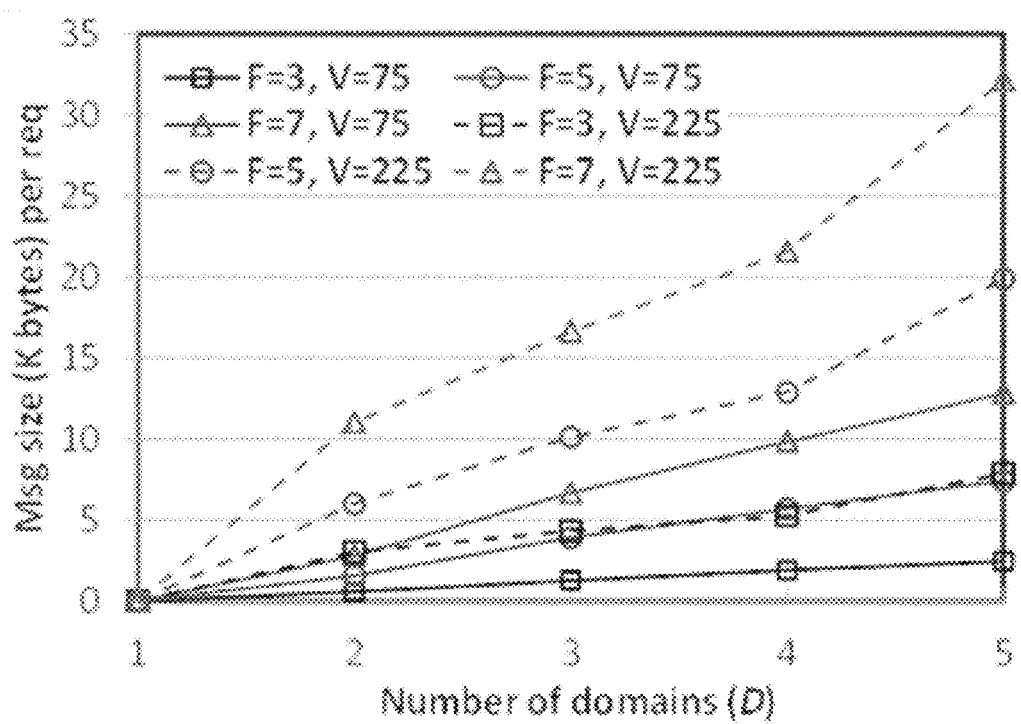
Figure 12C:
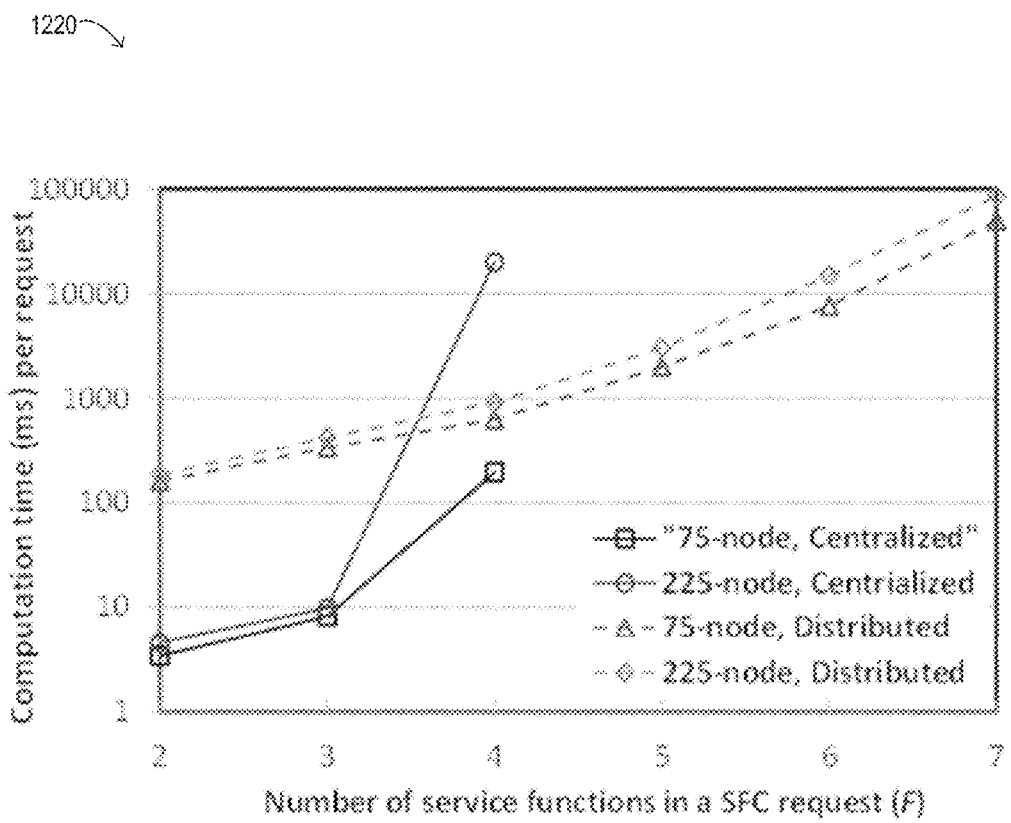

FIGS. 12A-12C illustrate selected results of these simulations. More specifically, FIG. 12A illustrates a graph 1200 depicting the average signaling delay between orchestrators for the distributed computing for an SFC request vs. the number of domains, D. In this simulation, fixed-ordered SFC requests were generated. The signaling delay shown in FIG. 12A represents the total delay of all supersteps for a given request, where the delay in each superstep is the maximum round-trip propagation delay between communicating orchestrators. The number of supersteps shown in FIG. 12A is equal to the number of service functions in a given request. As shown in FIG. 12A, higher values of F (e.g., larger numbers of service functions in the SFC requests) resulted in longer signaling delays due to having to perform more supersteps. In addition, FIG. 12A illustrates that higher values of D (e.g., larger numbers of network domains) resulted in longer average signaling delays. This may be due, for example, to having a higher chance that vertices in different domains and/or managed by different orchestrators are included in any given SFC solution. Note that, in at least some embodiments, the signaling delay may be heavily dependent on the selection of orchestrators and network partitions, since messages are exchanged between orchestrators, not physical nodes. For example, a 225-node network may have shorter signaling delay than that of a 75-node network.

FIG. 12B illustrates a graph 1210 depicting the average message size exchanged between orchestrators in a distributed system vs. the number of domains, D. As in the previous simulation, fixed-ordered SFC requests were generated. In this example, only the messages between orchestrators where included in the results. As shown in FIG. 12B, having higher F, V, and/or D values increased the total messages size for each SFC request. In some embodiments in which the messages exchanged between the same pair of orchestrators in a superstep can be combined into a single message, the maximum number of messages exchanged for a request may be $D(D-1)F$, which varies linearly with the request size, F.

FIG. 12C illustrates a graph 1220 that compares the computation time of the vertex-centric distributed algorithm described herein and a corresponding centralized exhaustive search algorithm vs. the number of service functions in an SFC request, F. Both algorithms were run on the same 1.6 gigabyte memory, two-processor virtual machine. In order to provide a fair comparison, the distributed algorithm was executed in a single partition with a single thread. In this simulation, flexible-ordered requests were generated with a varying number of service functions. The exhaustive algorithm first generated all possible fixed-ordered chains, each of which was then mapped to candidate vertices having the required functions. In this simulation, the computation complexity of the exhaustive algorithm varied exponentially with F. That is, the complexity varied as $F! \, V^F$, where the number of possible fixed-ordered chains is $F!$, and each chain has $V^F$ possible mappings to vertices. For V=75 (and for V=225), no results were obtained beyond a value of F=4 because the centralized approach failed after tens of minutes due to being out of memory. On the other hand, the distributed algorithm described herein was able to produce results for much higher values of F, demonstrating the superior efficiency and scalability of this approach. Note that, in at least some embodiments, the vertex-centric algorithms described herein may ensure that the vertices mapping to two consecutive functions in a request are adjacent, thus avoiding unnecessary function mappings of candidate vertices when there is no network connection between candidate vertices.

In at least some embodiments of the systems described herein, a vertex-centric approach to computing all feasible solutions to an SFC request in a multi-domain network may have advantages over earlier approaches. In different embodiments, the vertex-centric framework and resource orchestration approach described herein may be suitable for both centralized and distributed settings. It may avoid the issues associated with the replication of global state information in traditional architectures, and has been shown to be more efficient than earlier approaches in terms of signaling delay and the number of messages exchanged. In at least some embodiments, this approach may be highly scalable for computing all feasible mapping solutions for SFC requests in multi-domain networks. For example, the systems and methods described herein may, in some embodiments, be used to coordinate and control resources implemented on the 1Finity™ platform from Fujitsu Network Communications Inc. that cover access, metro, core, and datacenter networks.

In general, in at least some embodiments of the present disclosure, the vertex-centric distributed computing framework described herein may be used to solve large-scale, multi-domain, multi-layer network problems spanning service functions, virtual machines, data centers, switching systems, and the Internet of Things.

As disclosed herein, a distributed orchestration system and a vertex-centric distributed algorithm may be used to find all qualified service function chaining results in multi-domain networks. Simulation results have shown that the messaging complexity between orchestrators is proportional to the number of service functions in an SFC request. Simulations have also demonstrated that this approach provides superior efficiency and scalability than a conventional exhaustive approach, in many cases (including, e.g., when the number of service functions is greater than 4 in a 225-node network).

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for identifying a qualified service function chaining solution in a multi-domain network, comprising:
  receiving, at a resource orchestrator, a service function chain request specifying a plurality of service functions to be performed on respective physical nodes in the multi-domain network, each node being represented as a vertex in a resource orchestration framework;
  identifying one or more vertices at which a first one of the plurality of service functions is available;
  for a first one of the identified vertices:
    mapping the first identified vertex to the first one of the plurality of service functions in a candidate service function chain;
    determining that a second one of the plurality of service functions is available at a first neighbor vertex of the first identified vertex, wherein the first neighbor vertex resides in a different domain of the multi-domain network than the domain in which the first identified vertex resides; and
    mapping the first neighbor vertex to the second one of the plurality of service functions in the candidate service function chain to extend the candidate service function chain.

2. The method of claim 1, further comprising:
  determining that a third one of the plurality of service functions is available at a second neighbor vertex of the first neighbor vertex, wherein the second neighbor vertex resides in a different domain of the multi-domain network than the domain in which the first neighbor vertex resides; and
  mapping the second neighbor vertex to the third one of the plurality of service functions in the candidate service function chain to further extend the candidate service function chain.

3. The method of claim 1, wherein:
  mapping the first neighbor vertex to the second one of the plurality of service functions in the candidate service function chain completes the candidate service function chain; and
  the method further comprises returning the completed candidate service function chain to the resource orchestrator.

4. The method of claim 1, wherein:
  the service function chain request specifies a fixed order for the plurality of service functions to be performed on the respective physical nodes in the multi-domain network; and
  the fixed order specifies that the first one of the plurality of service functions is to be performed prior to the second one of the plurality of service functions.

5. The method of claim 1, further comprising:
  completing the candidate service function chain;
  completing one or more other candidate service function chains, wherein completing each of the other candidate service function chains comprises mapping a respective vertex in the resource orchestration framework to each of the plurality of service functions in the other candidate service function chain, and wherein the sets of mappings in the candidate service function chain and in each of the one or more other candidate service function chains are different;
  selecting, from among the candidate service function chain and the one or more other candidate service function chains, one or more service function chain solutions for execution, wherein the selecting is dependent on a service provider policy, a service provider constraint, or a requestor on whose behalf the service function chain request was received.

6. The method of claim 5, wherein the selecting is dependent on one or more of:
  a total delay of a candidate service function chain;
  a total cost of a candidate service function chain;
  an overlapping of physical nodes in two of the candidate service function chains;
  an overlapping of physical links in two of the candidate service function chains; or
  a load balancing mechanism.

7. The method of claim 1, wherein:
  the service function chain request specifies a flexible-ordering for the plurality of service functions to be performed on the respective physical nodes in the multi-domain network; and
  mapping the first identified vertex to the first one of the plurality of service functions in the candidate service function chain comprises mapping the first identified vertex to a service function in a position other than the first position in the candidate service function chain.

8. The method of claim 7, wherein:
  the method further comprises:
    completing the candidate service function chain; and
    completing a second candidate service function chain;
    completing the second candidate service function chain comprises mapping a respective vertex in the resource orchestration framework to each of the plurality of service functions in the second candidate service function chain, wherein vertices are mapped to the plurality of service functions in the second candidate service function chain in a different order than the order in which they were mapped to the plurality of service functions in the candidate service function chain.

9. The method of claim 1, wherein the resource orchestrator is a sole resource orchestrator for coordinating vertex-centric service function chaining in the multi-domain network.

10. The method of claim 1, wherein the resource orchestrator is one of a plurality of resource orchestrators for coordinating vertex-centric service function chaining in the multi-domain network, each of which is associated with a respective domain in the multi-domain network, and each of which coordinates execution of a common compute function on vertices in its respective domain.

11. The method of claim 10, wherein:
  identifying the one or more vertices at which a first one of the plurality of service functions is available comprises:
    the resource orchestrator sending a controller message to another one of the resource orchestrators, the other resource orchestrator being associated with the domain in which the first identified vertex resides; and
    the other resource orchestrator determining that the first one of the plurality of service functions is available at the first identified vertex; and mapping the first identified vertex to the first one of the plurality of service functions in the candidate service function chain is performed by the first identified vertex.

12. The method of claim 1, wherein:
the first one of the identified vertices and the first neighbor vertex are communicatively coupled to each other over a physical link; and
determining that the second one of the plurality of service functions is available at the first neighbor vertex comprises:
    determining that the physical link meets qualifications specified for the service function chain request;
    sending a controller message including the candidate service function chain to the first neighbor vertex; and
    the first neighbor vertex determining that the second one of the plurality of service functions is available at the first neighbor vertex.

13. A resource orchestration framework in a multi-domain network, the multi-domain network comprising a plurality of network domains, each comprising one or more physical nodes, wherein each of the physical nodes comprises circuitry or logic to perform a subset of a plurality of service functions supported in the multi-domain network;
wherein the resource orchestration framework comprises:
    a plurality of vertices, each of which represents a respective one of the physical nodes in the multi-domain network; and
    a resource orchestrator;
wherein each of the vertices in the resource orchestration framework comprises:
    a processor; and
    a memory that stores program instructions that when executed by the processor cause the processor to perform a compute function that is common among the vertices in the resource orchestration framework;
wherein the resource orchestrator comprises:
    a processor; and
    a memory that stores program instructions that when executed by the processor cause the processor to perform:
        receiving a service function chain request specifying a plurality of service functions to be performed on respective ones of the physical nodes in the multi-domain network;
        identifying one or more vertices in the resource orchestration framework at which a first one of the plurality of service functions is available; and
        coordinating execution of two more supersteps of the common compute function on multiple ones of the plurality of vertices, wherein, during a first superstep of the common compute function, the execution of the common compute function on the first one of the identified vertices comprises:
            mapping the first identified vertex to the first one of the plurality of service functions in a candidate service function chain; and
            determining whether or not a physical link between the first identified vertex and a first neighbor vertex of the first identified vertex meets qualifications specified for the service function chain request, wherein the first neighbor vertex resides in a different domain of the multi-domain network than the domain in which the first identified vertex resides.

14. The resource orchestration framework of claim 13, wherein:
during the first superstep, the execution of the common compute function on the first identified vertex further comprises:
    in response to determining that a physical link between the first identified vertex and the first neighbor vertex meets qualifications specified for the service function chain request, providing the candidate service function chain to the first neighbor vertex;
during a second superstep of the common compute function, the execution of the common compute function on the first neighbor vertex comprises:
    in response to obtaining the candidate service function chain, determining whether or not the candidate service function chain can be extended at the first neighbor vertex.

15. The resource orchestration framework of claim 14, wherein, during the second superstep, the execution of the common compute function on the first neighbor vertex further comprises:
    determining that a second one of the plurality of service functions is available at the first neighbor vertex; and
    mapping the first neighbor vertex to the second one of the plurality of service functions in the candidate service function chain to extend the candidate service function chain.

16. The resource orchestration framework of claim 15, wherein, during the second superstep, the execution of the common compute function on the first neighbor vertex further comprises:
    determining whether or not a physical link between the first neighbor vertex and a second neighbor vertex of the first neighbor vertex meets qualifications specified for the service function chain request, wherein the second neighbor vertex resides in a different domain of the multi-domain network than the domain in which the first neighbor vertex resides; and
    in response to determining that the physical link between the first neighbor vertex and the second neighbor vertex meets qualifications specified for the service function chain request, providing the extended candidate service function chain to the second neighbor vertex.

17. The resource orchestration framework of claim 15, wherein, during the second superstep, the execution of the common compute function on the first neighbor vertex further comprises:
    determining that the mapping of the first neighbor vertex to the second one of the plurality of service functions in the candidate service function chain completes the candidate service function chain; and
    providing the completed candidate service function chain to the resource orchestrator.

18. The resource orchestration framework of claim 17, wherein when executed by the processor of the resource orchestrator, the program instructions stored on the memory of the resource orchestrator cause the processor to perform:
    selecting, from among the completed candidate service function chain and one or more other completed candidate service function chains, one or more service function chain solutions for execution, wherein the selection is dependent on a service provider policy, a service provider constraint, or a requestor on whose behalf the service function chain request was received.

19. The resource orchestration framework of claim 13, wherein the resource orchestrator is a sole resource orchestrator for coordinating vertex-centric service function chaining in the multi-domain network.

20. The resource orchestration framework of claim 13, wherein the resource orchestration framework comprises a plurality of resource orchestrators, including the resource orchestrator, each of which is associated with a respective domain in the multi-domain network, and each of which coordinates the execution of the two more supersteps of the common compute function on vertices in its respective domain.

* * * * *